US011429841B1

(12) United States Patent
Huh et al.

(10) Patent No.: US 11,429,841 B1
(45) Date of Patent: Aug. 30, 2022

(54) FEEDBACK ADVERSARIAL LEARNING

(71) Applicant: Snap Inc., Santa Monica, CA (US)

(72) Inventors: Jacob Minyoung Huh, La Crescenta, CA (US); Shao-Hua Sun, Los Angeles, CA (US); Ning Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 889 days.

(21) Appl. No.: 16/192,437

(22) Filed: Nov. 15, 2018

Related U.S. Application Data

(60) Provisional application No. 62/711,275, filed on Jul. 27, 2018.

(51) Int. Cl.
*G06N 3/04* (2006.01)
*G06V 30/19* (2022.01)
*G06N 3/08* (2006.01)
*G06V 30/194* (2022.01)

(52) U.S. Cl.
CPC ......... *G06N 3/0445* (2013.01); *G06N 3/0454* (2013.01); *G06N 3/08* (2013.01); *G06V 30/194* (2022.01)

(58) Field of Classification Search
CPC combination set(s) only.
See application file for complete search history.

(56) References Cited

U.S. PATENT DOCUMENTS 8,185,275 B2 * 5/2012 Han ..................... A01B 69/001
382/104

OTHER PUBLICATIONS

Arjovsky, Martin, "Wasserstein GAN", arXiv:1701.07875v3 [stat. ML], (Dec. 6, 2017), 32 pgs.
Benaim, Sagie, "One-Sided Unsupervised Domain Mapping", 31st Conference on Neural Information Processing Systems (NIPS), Long Beach, CA, USA, (2017), 11 pgs.
Bousmalis, Konstantinos, "Unsupervised Pixel-Level Domain Adaptation with Generative Adversarial Networks", IEEE Conference on Computer Vision and Pattern Recognition, (2017), 10 pgs.
Cordts, Marius, "The Cityscapes Dataset for Semantic Urban Scene Understanding", IEEE Conference on Computer Vision and Pattern Recognition, (2016), 11 pgs.
Denton, Emily, "Deep Generative Image Models Using a Laplacian Pyramid of Adversarial Networks", Advances in Neural Information Processing Systems, (2015), 9 pgs.
Donahue, Jeff, "Adversarial Feature Learning", arXiv:1605.09782v7 [cs.LG], (Apr. 3, 2017), 18 pgs.
Dumoulin, Vincent, "Adversarially Learned Inference", arXiv:1606.00704v3 [stat.ML], (Feb. 21, 2017), 18 pgs.

(Continued)

*Primary Examiner* — Helen Zong
(74) *Attorney, Agent, or Firm* — Schwegman Lundberg & Woessner, P.A.

(57) ABSTRACT

Disclosed is a feedback adversarial learning framework, a recurrent framework for generative adversarial networks that can be widely adapted to not only stabilize training but also generate higher quality images. In some aspects, a discriminator's spatial outputs are distilled to improve generation quality. The disclosed embodiments model the discriminator into the generator, and the generator learns from its mistakes over time. In some aspects, a discriminator architecture encourages the model to be locally and globally consistent.

20 Claims, 21 Drawing Sheets

(56) References Cited

OTHER PUBLICATIONS

Goodfellow, Ian, "Generative Adversarial Nets", Advances in Neural Information Processing Systems 27, Curran Associates, Inc., (2014), 9 pgs.

Gulrajani, Ishaan, "Improved Training of Wasserstein GANs", arXiv:1704.00028 [cs.LG], (2017), 11 pgs.

Izuka, Satoshi, "Globally and Locally Consistent Image Completion", ACM Trans. Graph. 36,4, Article 107, (Jul. 2017), 14 pgs.

Isola, Phillip, "Image-to-Image Translation with Conditional Adversarial Networks", arXiv: 1611.07004 [cs.CV], (Nov. 22, 2017), 17 pgs.

Johnson, Justin, "Perceptual Losses for Real-Time Style Transfer and Super-Resolution", arXiv:1603.08155v1 [cs TV], (Mar. 27, 2016), 18 pgs.

Karras, Tero, "Progressive Growing of GANs for Improved Quality, Stability, and Variation", arXiv:1710.10196v3 [cs.NE], (Feb. 26, 2018), 26 pgs.

Kingma, Diederik P, "Adam: A Method for Stochastic Optimization", arXiv:1412.6980v9 [cs.LG], (Jan. 30, 2017), 15 ogs.

Li, Yijun, "Generative Face Completion", IEEE Conference on Computer Vision and Pattern Recognition, (2017), 9 pgs.

Liu, Ming-Yu, "Unsupervised Image-to-Image Translation Networks", 31st Conference on Neural Information Processing Systems, Long Beach, CA, USA, (2017), 9 pgs.

Liu, Ming-Yu, "Coupled Generative Adversarial Networks", 30th Conference on Neural Information Processing Systems, Barcelona, Spain, (2016), 9 pgs.

Mao, Xudong, "Multi-class Generative Adversarial Networks with the L2 Loss Function", arXiv:1611.04076v1 [cs0 TV], (Nov. 13, 2016), 15 pgs.

Mathieu, Michael, "Deep Multi-Scale Video Prediction Beyond Mean Square Error", arXiv:1511.05440v6 [cs.LG], (Feb. 26, 2016), 14 pgs.

Metz, Luke, "Unrolled Generative Adversarial Networks", arXiv:1611,02163v4 [cs.LG], (May 12, 2017), 25 pgs.

Mirza, Mehdi, "Conditional generative adversarial nets", arXiv preprint arXiv:1411.1784, (2014), 7 pgs.

Pathak, Deepak, "Context Encoders: Feature Learning by Inpainting", IEEE Conference on Computer Vision and Pattern Recognition, (2016), 9 pgs.

Radford, Alec, "Unsupervised Representation Learning with Deep Convolutional Generative Adversarial Networks", arXiv:1511.06434v2 [cs.LG], (Jan. 7, 2016), 16 pgs.

Reed, Scott, "Generative Adversarial Text to Image Synthesis", Proc. of the 33rd Int'l Conference on Machine Learning, New York, NY, USA, (2016), 10 pgs.

Salimans, Tim, "Improved Techniques for Training GANs", 30th Conference on Neural Information Processing Systems, Barcelona, Spain, (2016), 9 pgs.

Shelhamer, Evan, "Fully Convolutional Networks for Semantic Segmentation", arXiv: 1605.06211v1 [cs.CV], (May 20, 2016), 12 pgs.

Shrivastava, Ashish, "Learning from Simulated and Unsupervised Images through Adversarial Training", IEEE Conference on Computer Vision and Pattern Recognition, (2016), 10 pgs.

Vondrick, Carl, "Generating Videos with Scene Dynamics", 29th Conference on Neural Information Processing Systems, Barcelona, Spain; arXiv: 1609.02612v3 [cs.CV], (Oct. 26, 2016), 10 pgs.

Wang, Xiaolong, "Generative Image Modeling using Style and Structure Adversarial Networks", arXiv: 1603 05631 v2 [cs.CV], (Jul. 26, 2016), 22 pgs.

Wu, Jiajun, "Learning a Probabilistic Latent Space of Object Shapes via 3D Generative-Adversarial Modeling", 30th Conference on Neural Information Processing Systems, Barcelona, Spain , (2016), 9 pgs.

Yi, Zili, "DualGAN: Unsupervised Dual Learning for Image-to-Image Translation", IEEE International Conference on Computer Vision, (2017), 9 pgs.

Zhang, Han, "StackGAN: Text to Photo-Realistic Image Synthesis with Stacked Generative Adversarial Networks", EEE International Conference on Computer Vision, (2016), 9 pgs.

Zhang, Richard, "Colorful image colorization", arXiv:1603.08511 v5 [cs.CV], (Oct. 5, 2016), 29 pgs.

Zhou, Yipin, "Learning Temporal Transformations from Time-Lapse Videos", arXiv:1608.07724v1 [cs.CV], (Aug. 27, 2016), 16 pgs.

Zhu, Jun-Yan, "Generative Visual Manipulation on the Natural Image Manifold", arXiv:1609.03552v2 [cs.CV], (Sep. 25, 2016), 16 pgs.

Zhu, Jun-Yan, "Unpaired Image-to-Image Translation Using Cycle-Consistent Adversarial Networks", IEEE International Conference on Computer Vision, (2017), 10 pgs.

\* cited by examiner

FEEDBACK ADVERSARIAL LEARNING

CROSS REFERENCE TO RELATED APPLICATIONS

This application claims priority to U.S. Provisional Application No. 62/711,275, filed Jul. 27, 2018, and entitled "Drawings with the Adversary: Image-to-Image Translation Using Feedback Adversarial Learning." The contents of this prior application are considered part of this application, and is hereby incorporated by reference in its entirety.

TECHNICAL FIELD

The present disclosure generally relates to the technical field of image to image translation. In particular, this disclosure solves the technical problem of a discriminator overpowering an image generator, which has resulted in unstable training with previous approaches.

BACKGROUND

Generative adversarial networks have shown promising results for generating higher quality images. Adversarial networks have been applied to a variety of applications including feature learning, image inpainting, text to image synthesis, future frame prediction, image editing, domain adaptation, 3D modeling, and video generation.

Some recent work has focused on paired image-to-image translation by using conditional generative adversarial networks (GANs). However, the difficulty of collecting paired data poses a problem. Hence, other works have tackled the task of unpaired image-to-image translation and have shown great success in being able to relate two arbitrary image domains.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1A:
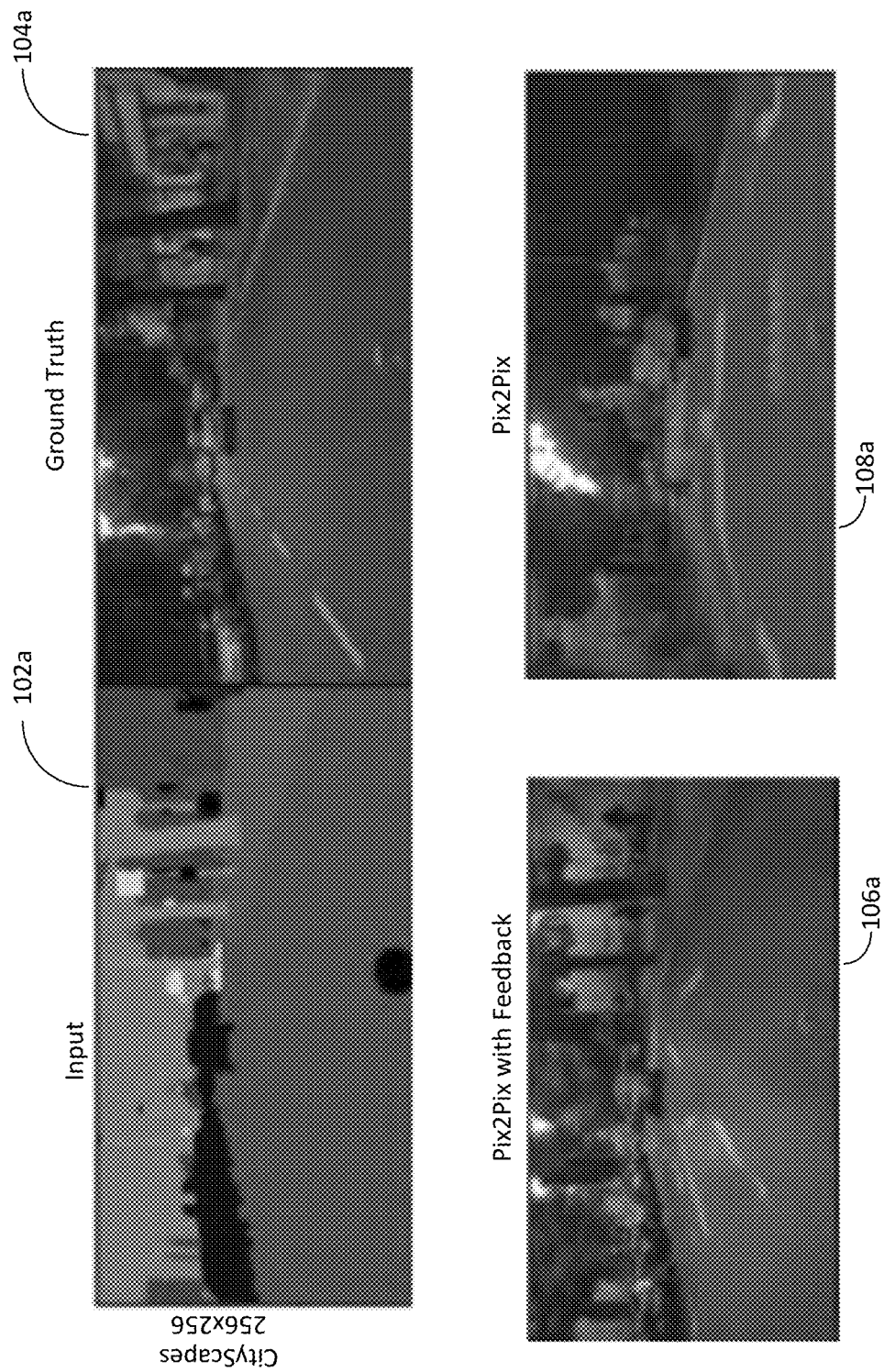
FIGS. 1A-C demonstrates a qualitative improvement of using feedback adversarial learning on a cityscapes segmentation-to-photo.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A task of generating an image $y \in Y$ given an image $x \in X$ has traditionally been called image-to-image translation, where the goal of the task is to imagine what image x would look like in domain Y. Previous works have shown great success in generating translation between highly correlated image pairs $\{x, y\}$. Specifically, photo realistic images may be generated using adversarial training. However, obtaining such paired images is often not feasible (e.g. photo-to-segmentation, image-to-sketch, and aerial-to-maps). Therefore, works in unpaired image-to-image translation have recently gained popularity. With the modern advancements in convolutional neural networks and adversarial training, it has been shown that it is possible to generate photo-realistic images with unpaired data.

The success of image-to-image translation roots to the emerging research in generative adversarial networks, a mini-max formulation of a generative model in which a generator G attempts to generate an image y that can fool a discriminator D. Despite success with this technique, the discriminator D often overpowers the generator, resulting in very unstable training.

The discriminator may provide a learning signal to the generator during training time. Yet, the fact that the discriminator may win frequently may indicate that there is still information in the discriminator that could help the generator improve. Therefore, if the generator could leverage this remaining information from the discriminator, the generator could produce better quality images over time.

In theory, a gradient from the discriminator provides feedback to the generator, encouraging the generator to improve its generation quality for the next time it sees the same exact image. However, due to the aggregation of gradients over multiple mini-batches, a next generation of images may not necessarily improve relative to a previous generation. At least some of the disclosed embodiments demonstrate that by explicitly modeling feedback into the generator, improvement in generation quality may be achieved. One goal of the disclosed embodiments is to utilize feedback from discriminators and improve the generator over time.

In image-to-image translation, local discriminators (e.g., PatchGAN) have shown superior performance over traditional global discriminators. Making local decisions defined by its receptive fields, a discriminator may be configured to output a spatial decision map that is consistent to an input image. Some of the disclosed embodiments use this decision map as a blueprint for the generator.

The disclosed embodiments provide a generator that can take advantage of the discriminator's spatial decision map. An extension of a patch-based local discriminator is also disclosed, which may enforce local-to-global coherency in the generated images. Furthermore, some of the disclosed embodiments demonstrate that using feedback leads to better performance than one shot generation models, and that feedback can be easily adapted to existing models for paired and unpaired translation, as shown in FIG. 1.

Generative adversarial networks (GANs) are generative models that attempt to generate an image y from a noise vector z by modeling a data distribution G: x→y, $$y=G(z) \quad (1)$$

On the other hand, conditional GANs condition the generation on the input x rather than z to generate the output image y, G:x→y. Conditional GANs can be decomposed into an encoder $G_e$ that maps image x into the latent vector z, $G_e$: x→z, and a decoder $G_d$ that maps the latent vector z back to the image space y, $G_d$: z→y. In both cases, the goal of the generator G is to generate realistic images that can fool the discriminator D. We can write the generated image $\hat{y}$ as:

$$\hat{y}=G(x)=G_d(G_e(x)) \quad (2)$$

Depending on the task, a generator would incur a reconstruction loss on $\hat{y}$:

$$\mathcal{L}_{rec}=\|\hat{y}-y\|_p=\|G(x)-y\|_p \quad (3)$$

For unpaired image translation, specifically cycle consistent generative adversarial networks, the generator learns a forward model that maps image x into y, G:x→y, such that y can be mapped back to the original image using the inverse model F:y→x. Computing the reconstruction loss on the inversely mapped images (cycle loss) forces the intermediate representation to be structurally consistent with the original image. We can summarize this with the following equation:

$$\mathcal{L}_{cyc}=\|F(G(x))-x\|_p+\|G(F(y))-y\|_p \quad (4)$$

To force the intermediate representation to be meaningful, there is a discriminator $D_X$ and $D_Y$, that discriminates whether the generated image is indistinguishable from the images in the given domain. Note that the formulation of cycle-consistent GAN is not the only existing formulation of unpaired translation. This includes M. Liu, et. al., *Unsupervised Image-to-image Translation Networks*, CoRR, abs/1703.00848, 2017, that uses shared latent embedding space, and S. Benaim, et. al., *One-sided unsupervised domain mapping*. CoRR, abs/1706.00826, 2017 that uses a single generator by learning a self-distance metric between the domains.

The goal of the discriminator is to discriminate generated images from real images. Traditionally, the goal of the generator has been to maximize the log-likelihood of fooling the discriminator with the generated images.

$$\mathcal{L}_{GAN}=\mathbb{E}[\log D(y)]+\mathbb{E}[\log(1-D(G(x)))] \quad (5)$$

X. Mao, *Multi-class Generative Adversarial Networks with the L2 Loss Function*, CoRR, abs/1611.04076, 2016 showed that instead of minimizing the negative log-likelihood, the least-squares may be minimized to stabilize training and generate better quality images. We can thus reformulate Equation (5) as:

$$\mathcal{L}_{LSGAN}=\mathbb{E}[(1-D(y))^2]+\mathbb{E}[(D(G(x)))] \quad (6)$$

Disclosed herein is a new formulation for feedback adversarial learning. In some aspects, the discriminator is added into the generation loop. This technique can be applied to any framework that uses a local discriminator. A local discriminator can be simply described as a discriminator that takes an input image and outputs a prediction map, where each pixel corresponds to a decision made, constrained by its receptive field. Since the discriminator's response may be spatially consistent to the input image, this information can be provided to the generator.

The disclosed embodiments improve on existing image to image translation models via use of feedback adversarial learning. Some embodiments use popular frameworks such as those disclosed in P. Isola, et. al, Image-to-image translation with conditional adversarial networks, arxiv, 2016 for paired image-to-image translation and frameworks disclosed in J. Y, et. al, Unpaired image-to-image translation using cycle-consistent adversarial network, International Conference of Computer Vision (ICCV), 2017 for unpaired image to image translation.

The disclosed embodiments also may rely on recurrence. Instead of deploying a multi-stage coarse-to-fine generation model, some disclosed embodiments train a model that explicitly uses a discriminator's spatial output to recursively improve the image generation.

Figure 1B:
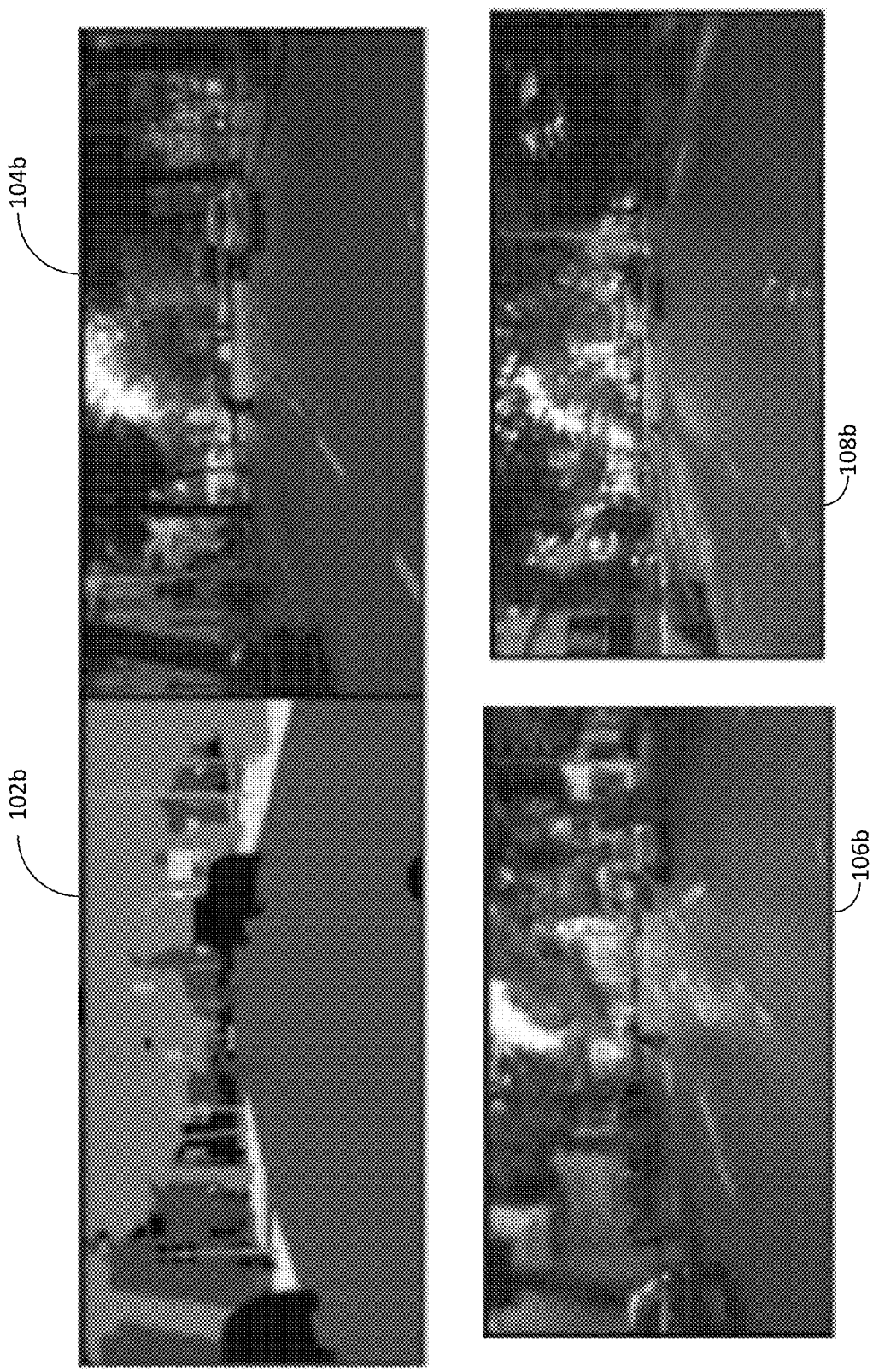
Figure 1C:
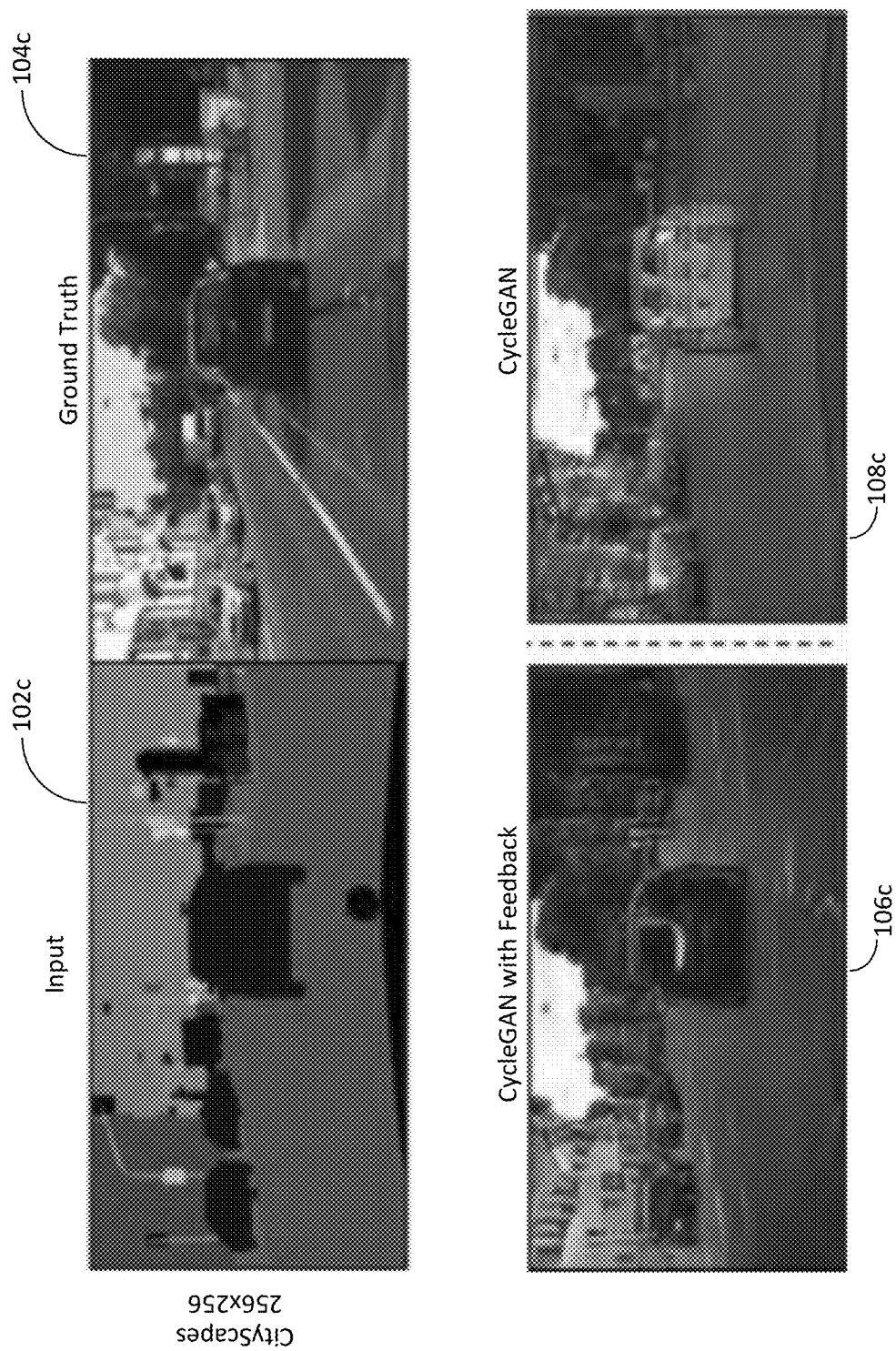

FIGS. 1A-C demonstrates a qualitative improvement of using feedback adversarial learning on a cityscapes segmentation-to-photo. The results shown in FIG. 1A-C are achieved using a feedback T parameter of two (2). FIGS. 1A-C includes cityscape images 102a-c, and ground truth images 104a-c respectively. FIG. 1A shows a Pix2ix image 106a of the input image 102a, the image 106a generated using enhanced feedback resulting from some of the disclosed embodiments, and an unmodified Pix2Pix image 108a based on the input image 102a.

FIG. 1B shows a Pix2Pix image 106b that is enhanced using methods of the present disclosure, that is based on the input image 102b. FIG. 1B also shows an unmodified pix2pix image 108b of the input image 102b. Pix2pix is an implementation of a image-to-image translation using conditional adversarial networks.

FIG. 1C shows a Cycle GAN image 106c based on the input image 102c, the image 106c generated based on feedback provided via some of the disclosed embodiments. FIG. 1C also shows an unmodified Cycle GAN image 108c of the input image 102c.

Figure 2:
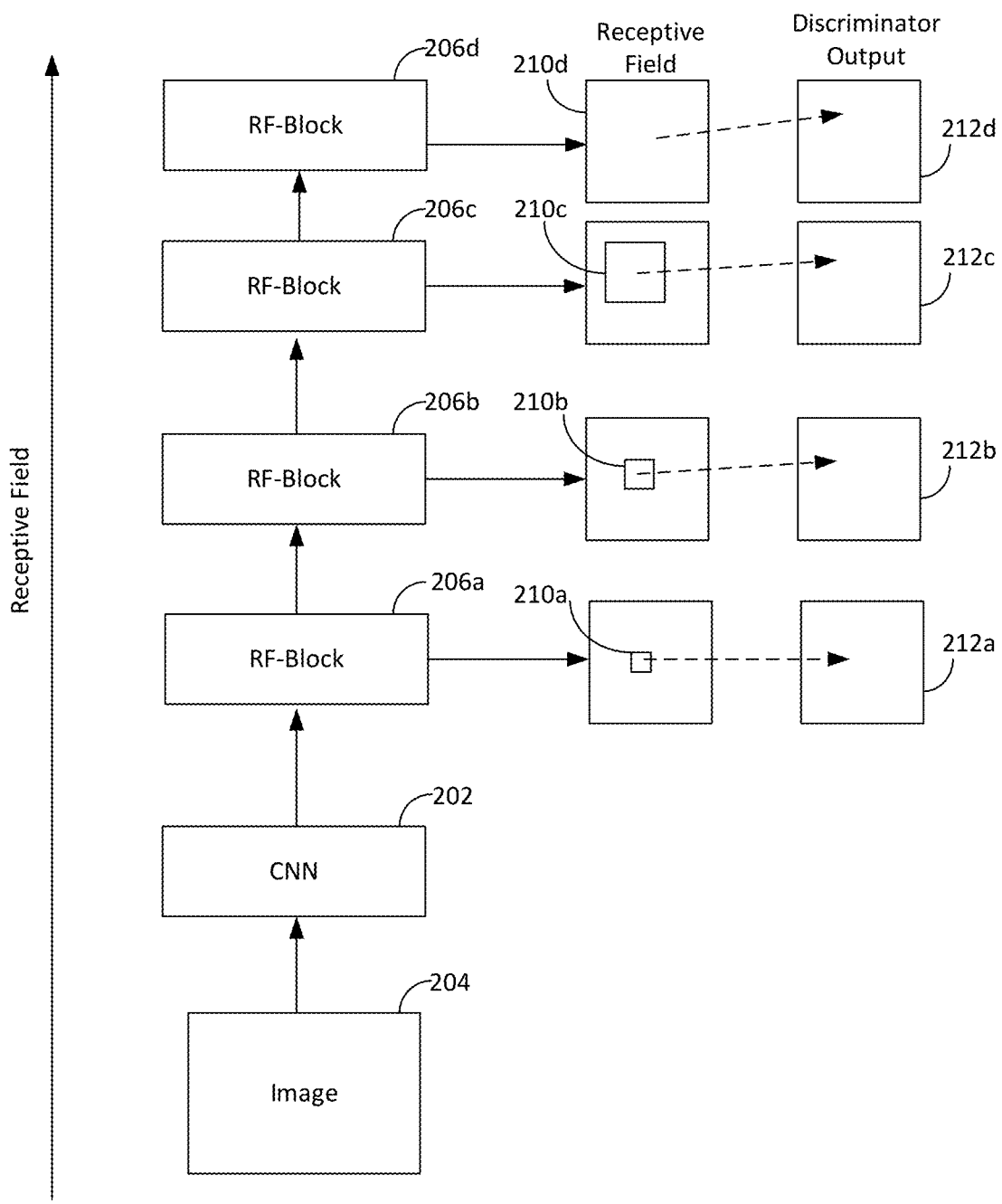
FIG. 2 is a high level diagram of a receptive discriminator.

FIG. 2 is a high level diagram of a receptive discriminator. A receptive field may increase with convolutional striding, so an architecture of a discriminator may be tuned to determine a receptive field that produces a best signal for the generator. Small receptive fields may generate locally pixel-crisp images, and larger receptive fields may generate a more semantically consistent image. A combination of both local and global discriminators may improve generation quality. However, use of multiple discriminators may be disadvantageous, at least in some implementations.

To address this problem, the disclosed embodiments utilize a discriminator that provides a collection of responses at varying receptive field sizes. If we construct a discriminator as shown in FIG. 2, we can extract the output at each layer to form a collection of discriminator responses. FIG. 2 shows a convolutional neural network 202 receiving an image 204. The convolutional neural network 202 processes the image 204 using four different receptive field blocks 206a-d that analyze four different receptive field sizes 210a-d. Each of the blocks 206a-d generates corresponding spatial discriminator outputs 212a-d. Each pixel in the discriminator's output 212a-d indicates the decision made by the discriminator given the corresponding receptive field view 210a-d. The discriminator data flow shown in FIG. 2 may provide for output at each layer of the discriminator to form a collection of discriminative responses. Denoting the discriminator's set of output responses as R, we can generate equation 9 below:

$$D(\hat{y}_t) = \{r_t^l\} l \in R \quad (9)$$

We can interpret $r_t^l$ as the discriminator's output of image $\hat{y}_t$ at layer l and $\{r_t^l\} l \in R$ as a set of all the responses at every layer. Each $\{r_t^l\}$ has a different receptive field and a different dimension. Reflecting these changes made in Equation 9 to Equation 8, we have:

$$\hat{y}_t = G_d(G_e(x), \hat{y}_{t-1}, \{r_t^l\} l \in R) \quad (10)$$

For simplicity, we define the generated image at time step t as $\hat{y}_t = G(x,t)$ and the output response at layer l as $\{r_t^l\} = D(y,l)$. The loss function of our feedback discriminator can be expressed as:

$$\mathcal{L}_{FBGAN} = \Sigma_{t \in T} \Sigma_{l \in R} \lambda_l ( \mathbb{E} [\|D(G(x,t),l) - 1\|_1] + \mathbb{E} [\|D(y,l)\|_1]) \quad (11)$$

where $\lambda_l$ is a constant hyperparameter that scales the importance of each receptive field. In other words, we want to minimize the expected discriminative loss at every receptive field at every time step. Having a full range of feedback encourages the generation to be both locally and globally consistent.

In some aspects, the generator may use an architecture as described in J. Johnson, A. Alahi, and F. Li. In Perceptual losses for real-time style transfer and super-resolution. CoRR, abs/1603.08155, 2016. For both the generator and the discriminator, gamma values may be set to 0.5 in some aspects. Models may be trained with an instance norm and a batch size of 1 in some embodiments. The discriminator may be trained by maintaining a history of generated images and sub-sample from the history. This may increase the stability of the training by reminding the discriminator about the generated images in the past.

Figure 3:
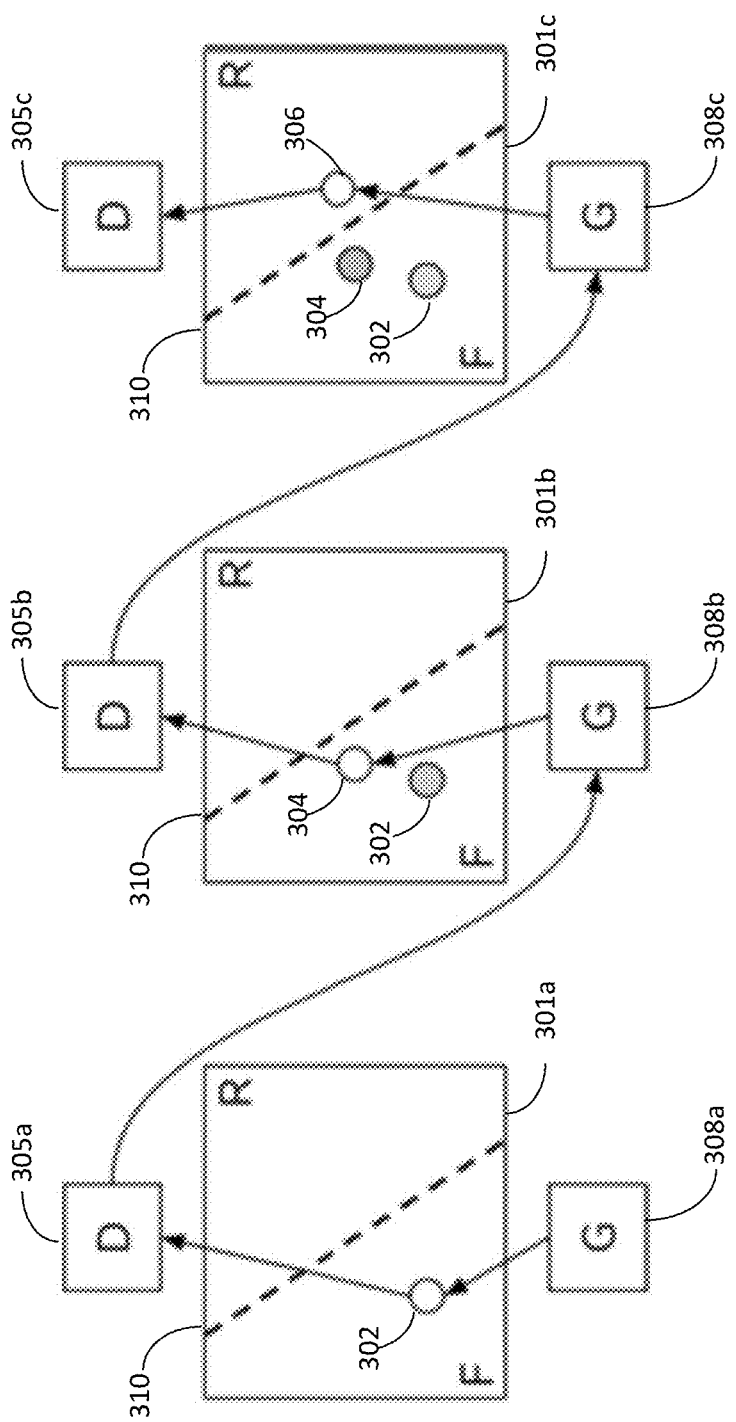
FIG. 3 shows a high-level diagram of successive iterations of a feedback adversarial learning framework.

FIG. 3 shows a high-level diagram of successive iterations 301a-c of a feedback adversarial learning framework. The white circle 302 in iteration 301a indicates an image generated by a generator 308a in a discriminator 305a manifold. In a second iteration 301b, the white circle 302 is now gray, indicating it represents an image generated in the previous iteration 301a. The circle 304 in iteration 301b represents an image generated by the generator 306b in the iteration 301b. The image 304 is evaluated by an updated discriminator 305b. In iteration 301c, the two previously generated images 302 and 304 are shown as shaded, to illustrate they are results of previous iterations 301a-b. The image 306 is generated by the generator 308c as evaluated in the discriminator 305c manifold.

A goal of some of the disclosed embodiments is to utilize feedback and iteratively improve generation of an image in a direction that is considered "real" by the discriminator. The goal in FIG. 3 is represented by the line 305. FIG. 3 shows the goal of the disclosed model is to utilize feedback from discriminators 305a-c to improve generators 308a-c over time.

Figure 4A:
FIGS. 4A-B each compare images generated using different types of discriminators.
Figure 4B:

FIGS. 4A-B each compare images generated using different types of discriminators. A local discriminator generating the images 402a and 404a uses a 70×70 receptive field. The receptive discriminator generating images 402d and 404d implements a single architecture with four different receptive field sizes and is able to achieve better qualitative results. Images 402b and 404b both result from a global discriminator and images 402c and 404c result from an implementation using a combined local and global discriminator.

Figure 5:
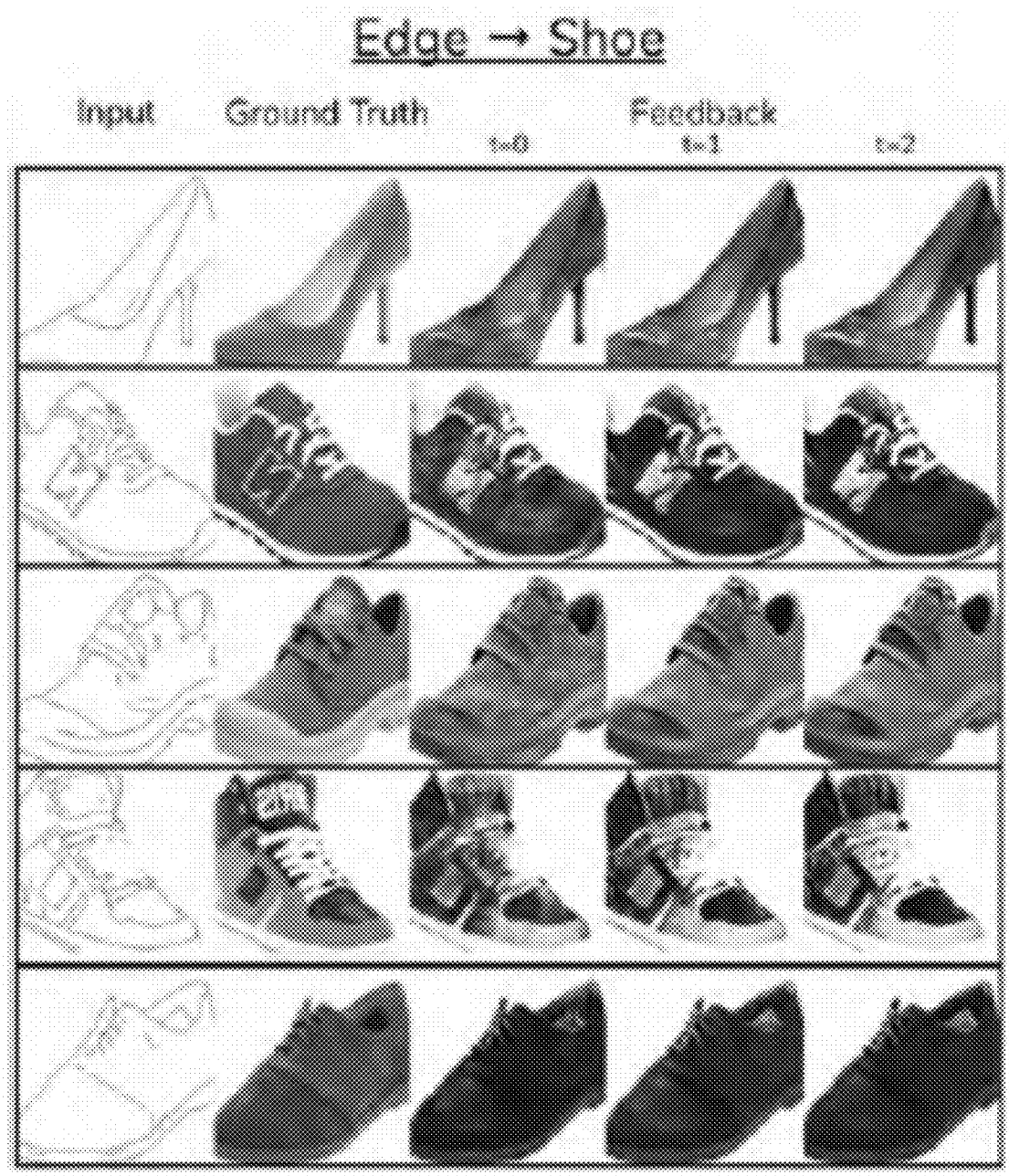
FIG. 5 show results for paired image-to-image translation tasks of edges-to-shoes.
Figure 6A:
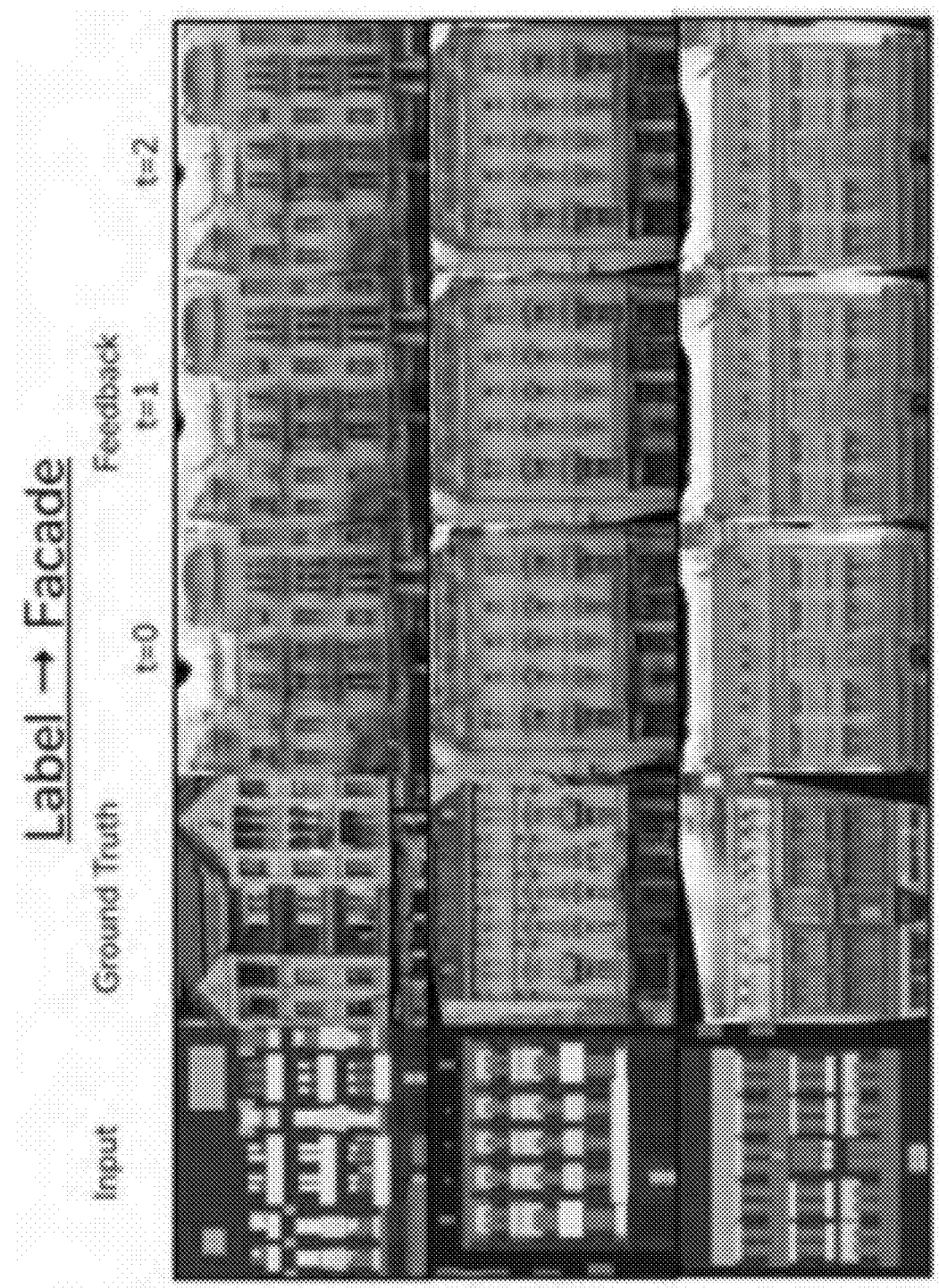
FIGS. 6A-B show results for paired image-to-image translation tasks of labels-to-facades.
Figure 6B:
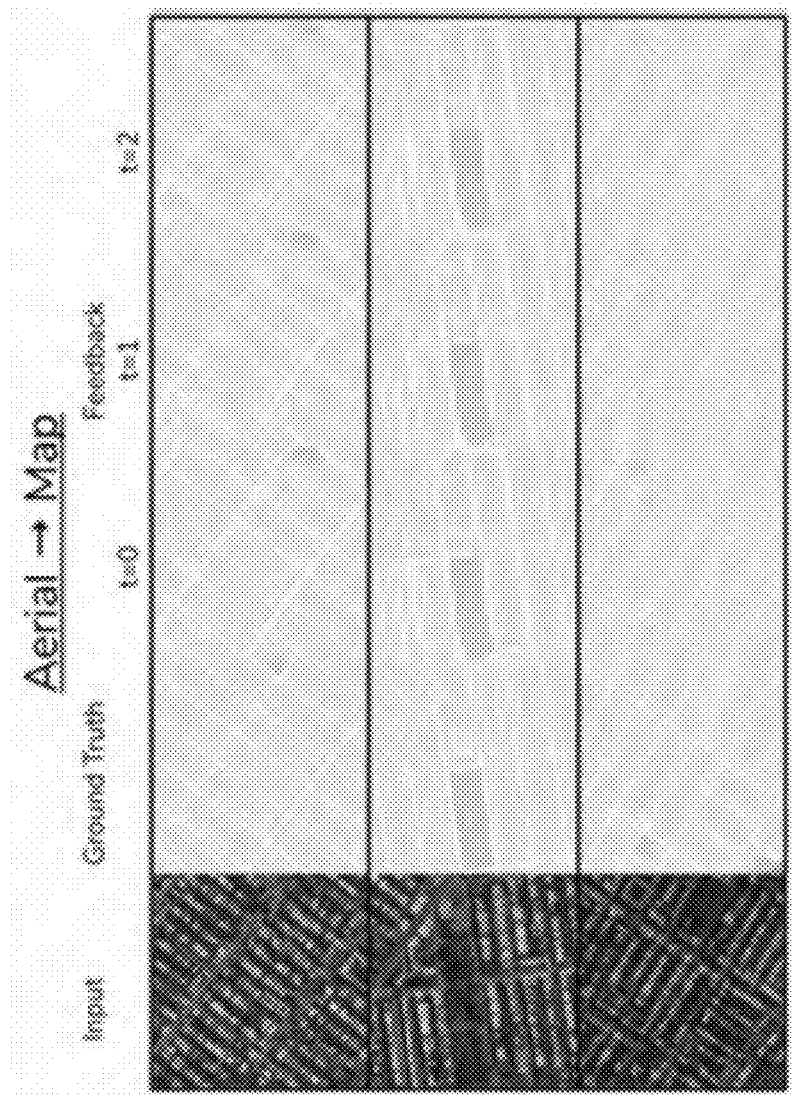
Figure 7:
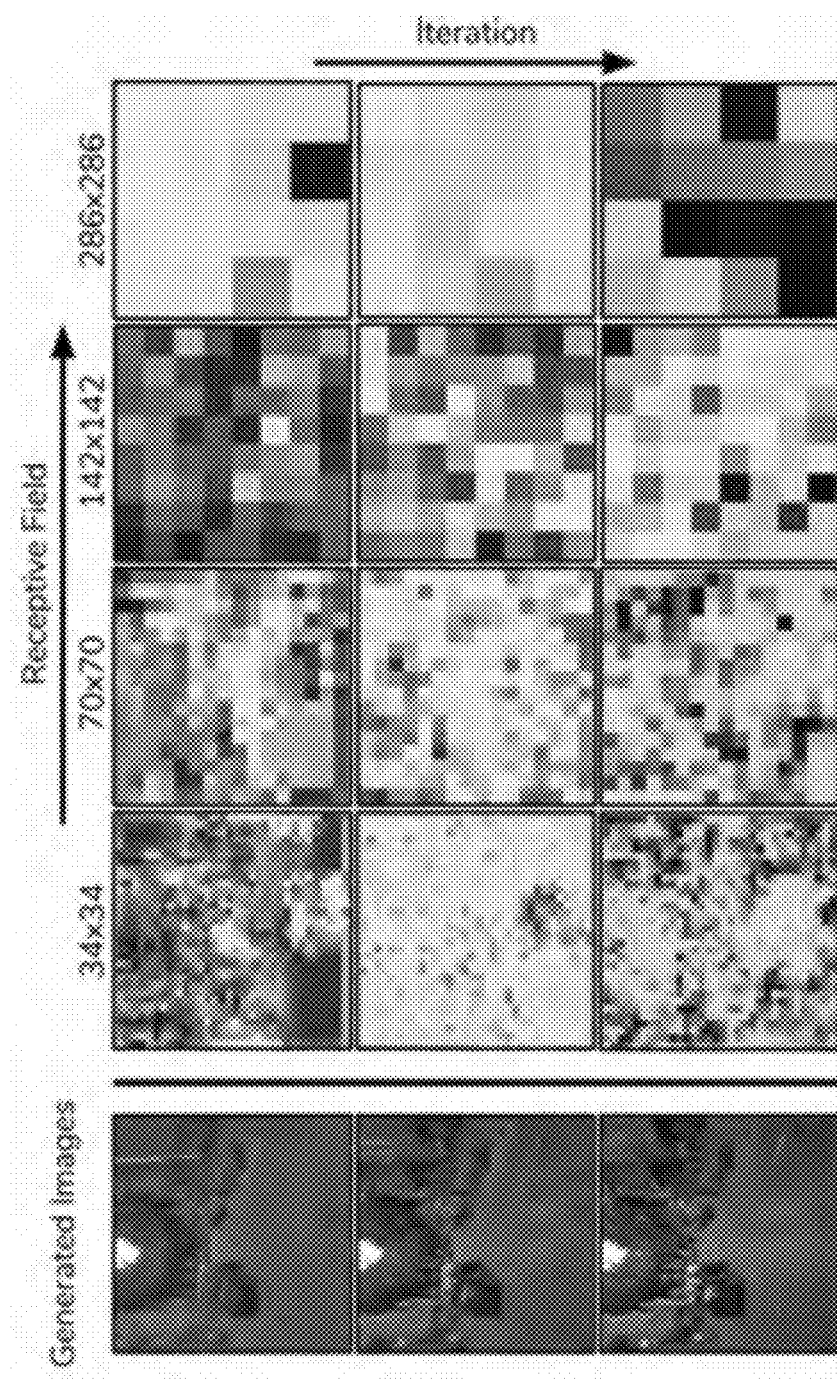
FIG. 7 shows results for paired image-to-image translation tasks of aerial-to-maps.
Figure 8:
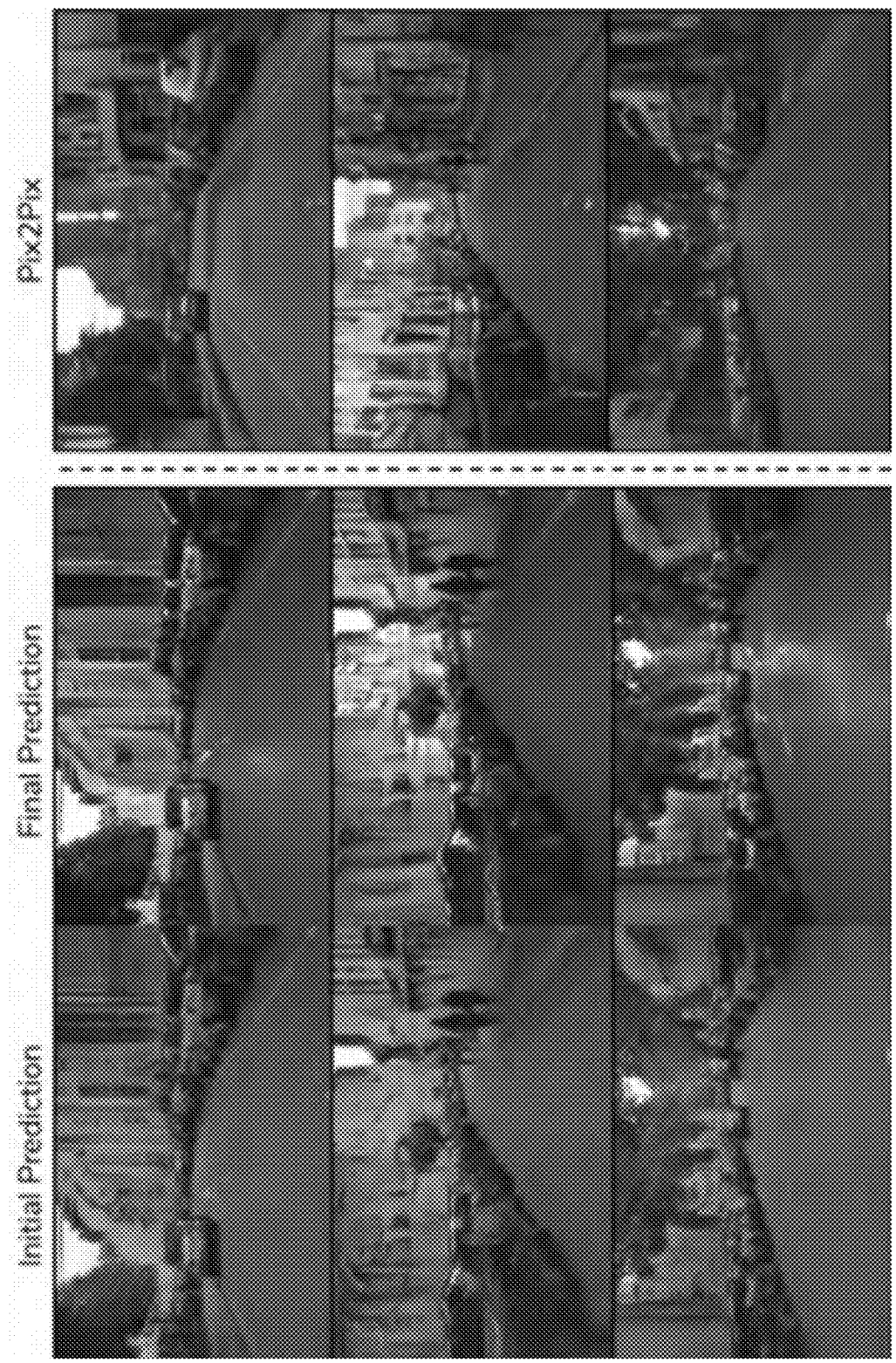
FIG. 8 shows results for paired image-to-image translation tasks of segmentation-to-photo.

FIG. 5 (edges-to-shoes), FIGS. 6A-B (labels-to-facades), FIG. 7 (aerial-to-maps), and FIG. 8 (segmentation-to-photo) show results for paired image-to-image translation tasks. The results shown in FIGS. 5-8 utilize a X, value of [0.3, 0.4, 0.2, 0.1] in order of increasing receptive field. The results show large improvements over time for under-constrained problems such as segmentation-to-photo (FIG. 8) and edges-to-shoes (FIG. 5). For simpler tasks such as facades and aerial-to-map shown in FIG. 6, the improvements are not as large. One possible conclusion from these results is that when the task is relatively simple, a single step generation suffices and there is less room for improvement. On facades, for example, other methods have shown that L1-loss is often sufficient in generating realistic images.

FIG. 7 shows a visualization of a discriminator's prediction over time for four receptive fields. FIG. 7 vertically illustrates changes to receptive fields at each iteration.

Figure 9A:
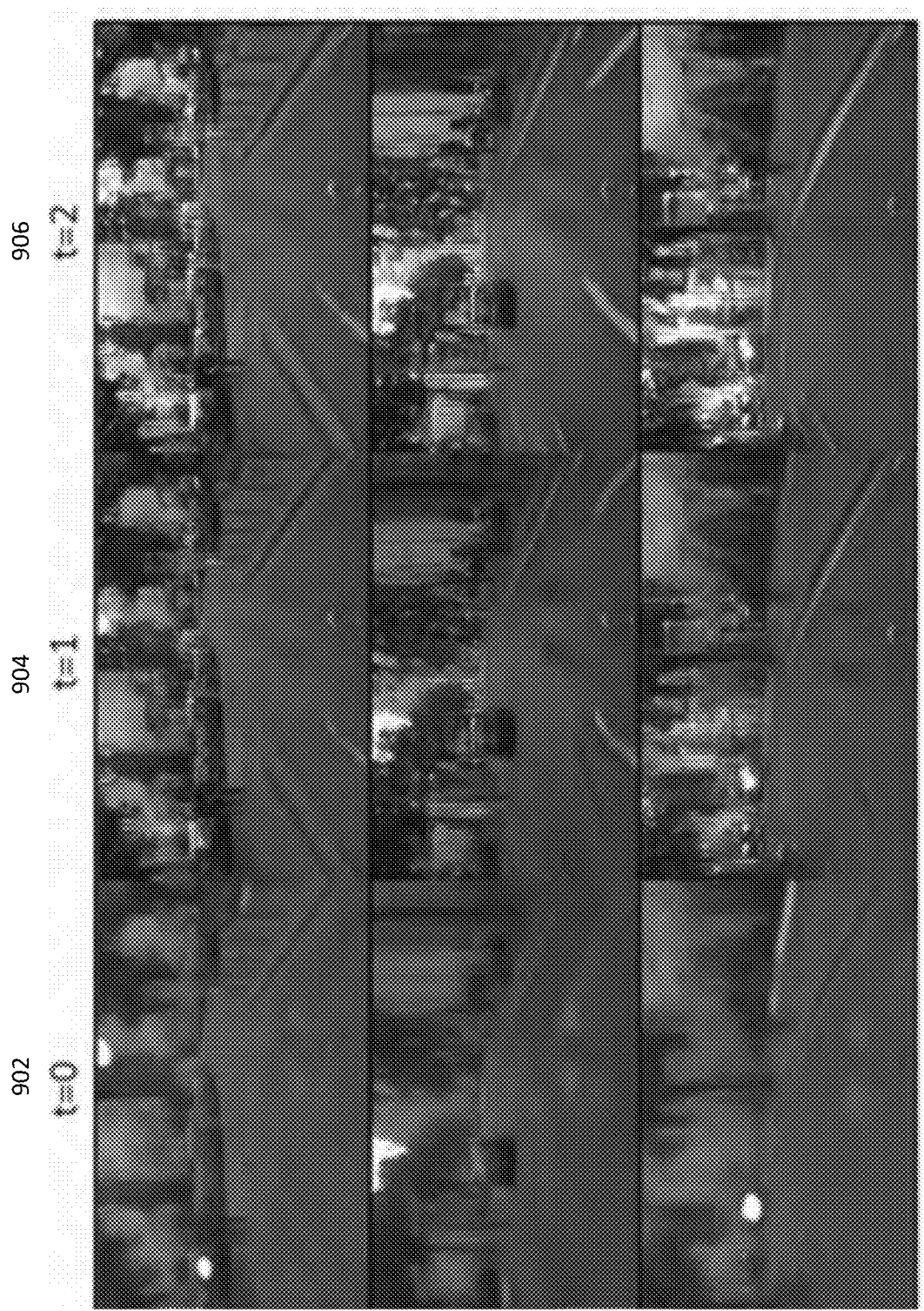
FIGS. 9A-D demonstrate performance of one of the disclosed embodiments using cityscapes test images.
Figure 9B:
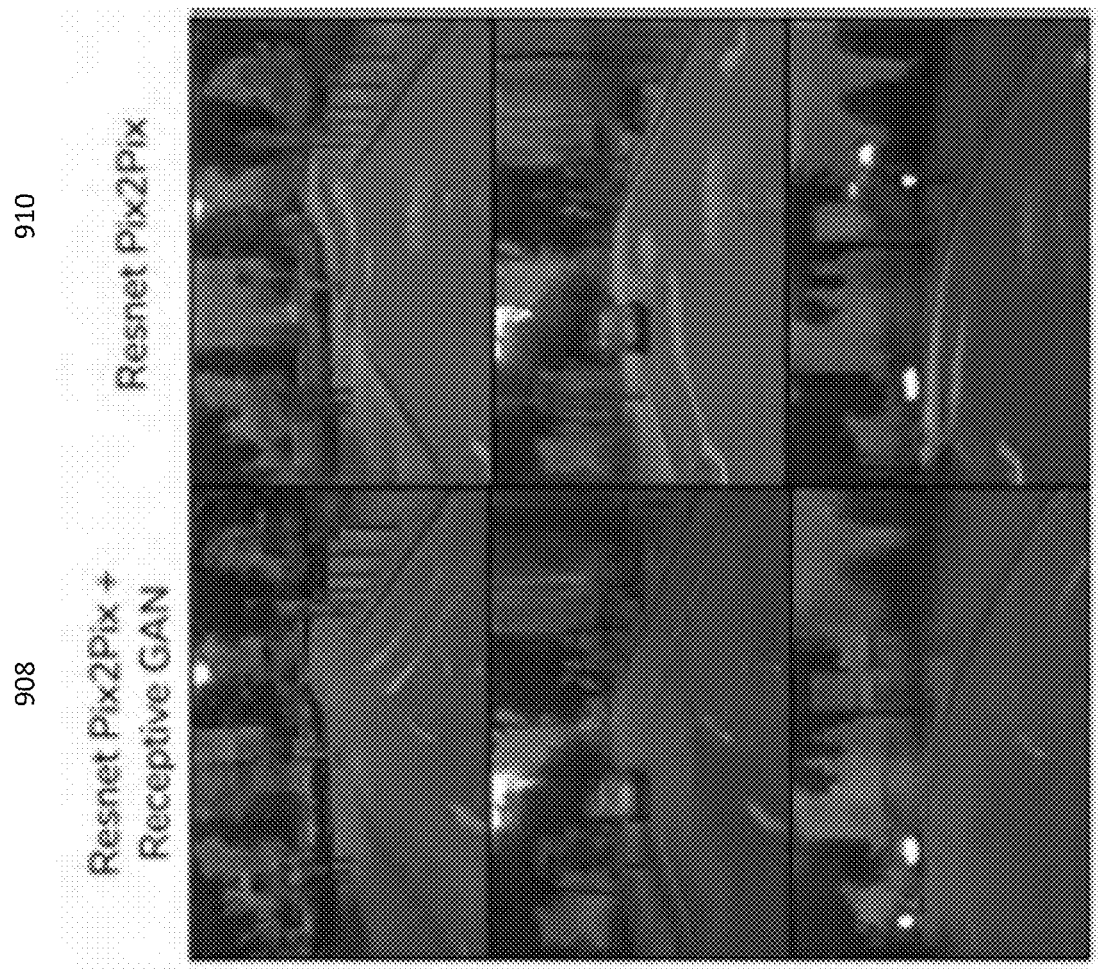
Figure 9B:
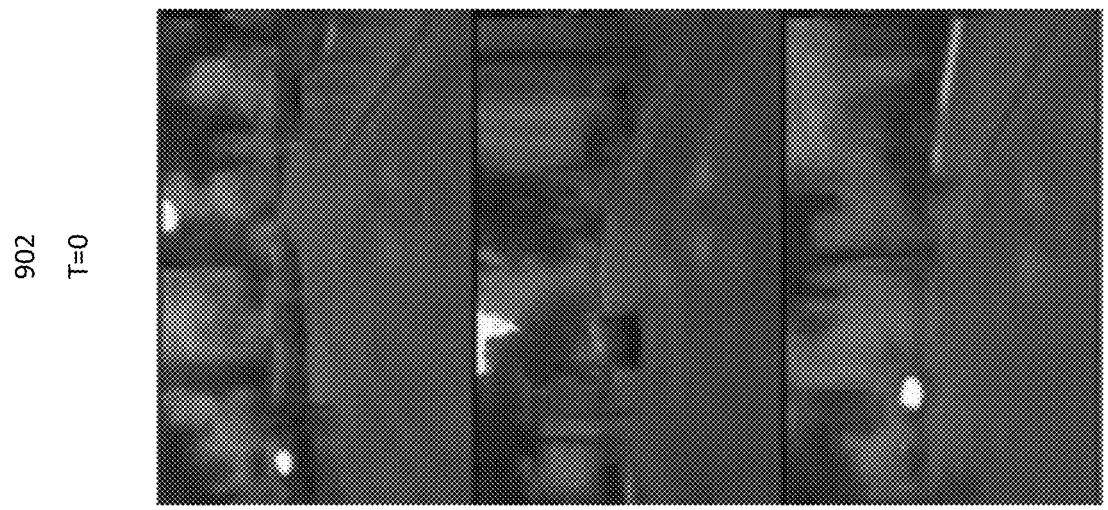
Figure 9C:
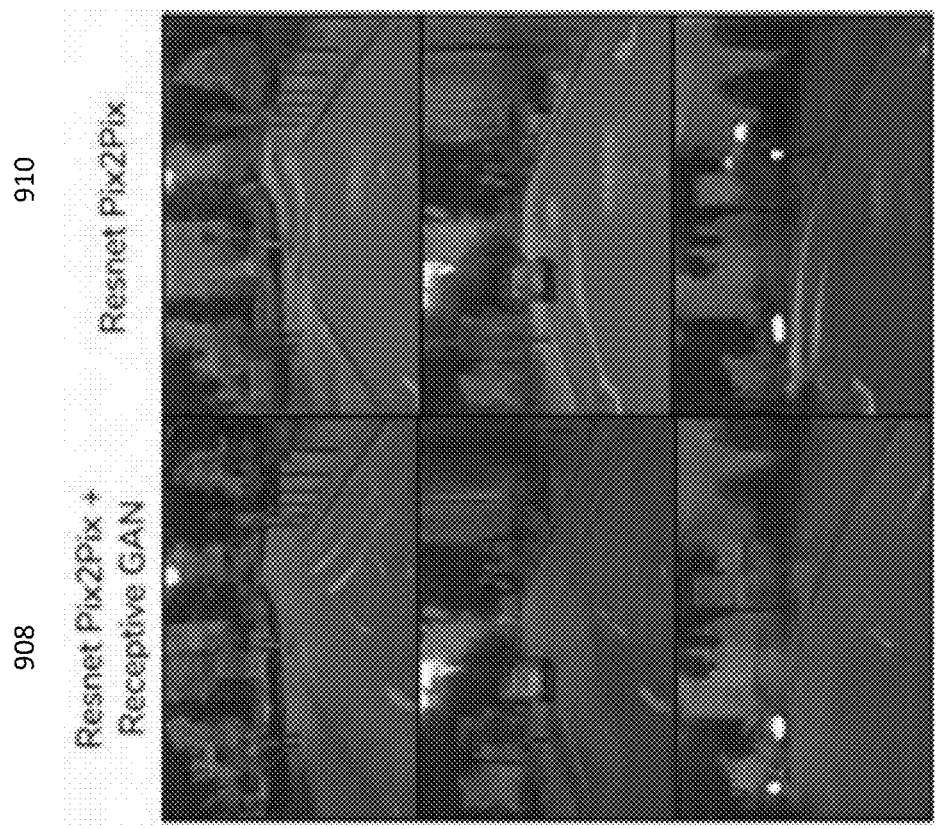
Figure 9C:
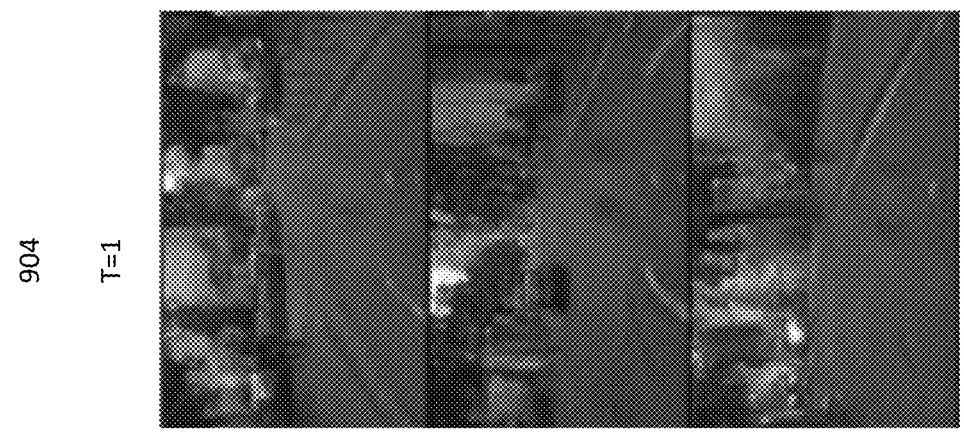
Figure 9D:
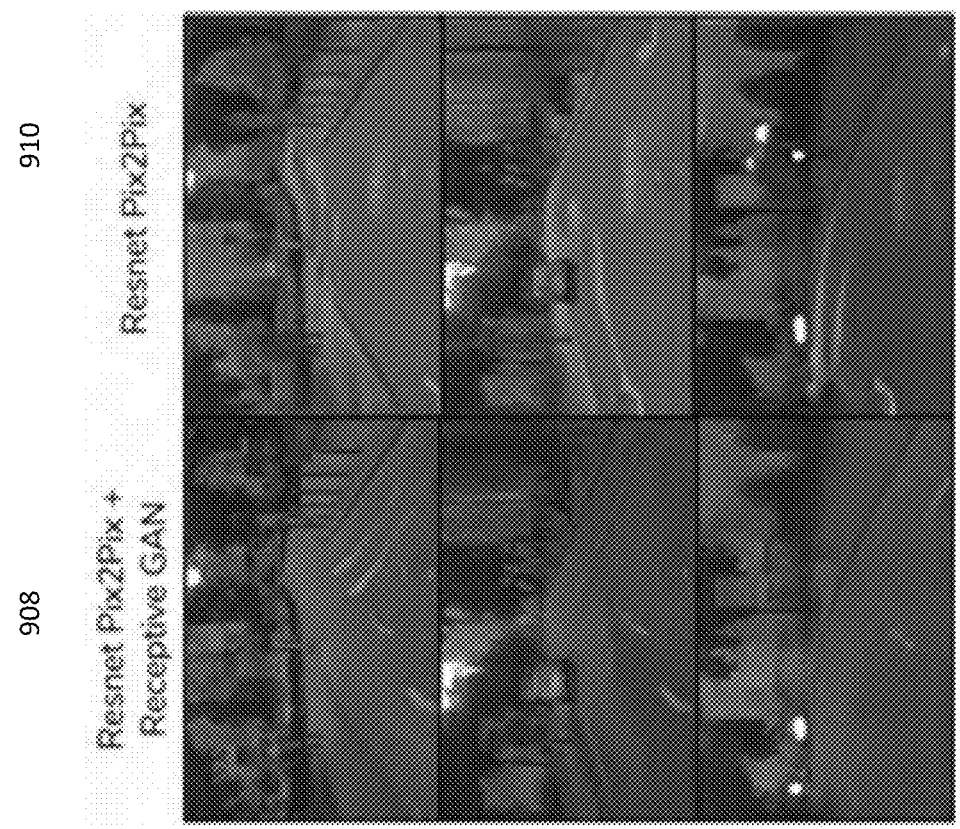
Figure 9D:
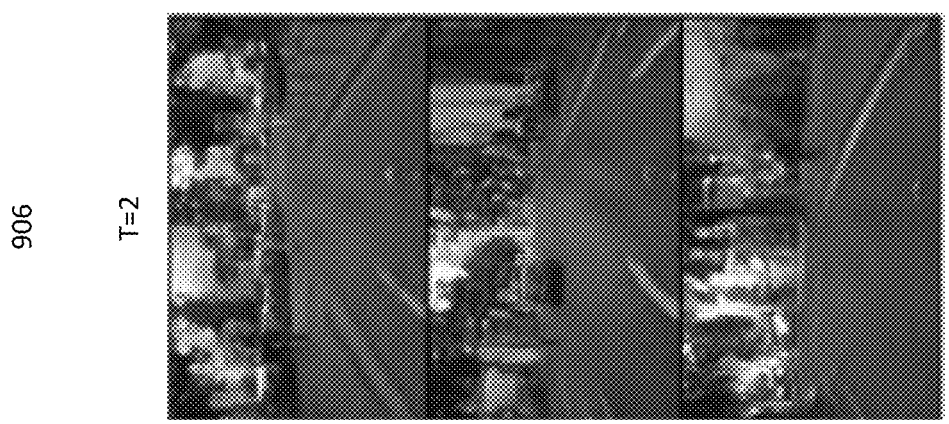

FIGS. 9A-D demonstrate performance of one of the disclosed embodiments using the cityscapes test images. The images shown in FIGS. 9A-D are 512×512 images. FIG. 9A shows a comparison of resulting images in column 902 with time step t equal to zero (0), column 904 with time step t equal to one (1), and column 906 with time step t equal to two (2). The quality of the images generally improves when moving from left to right in FIG. 9A, showing that the iterative nature of the disclosed embodiments provide additional opportunities for the generator to learn from the discriminator. FIGS. 9A-D further show that the model appears to be more resilient when faced with relatively more difficult tasks. The model was able to generate significantly higher quality images compared to single step generation models. We observe that when the task becomes significantly difficult, the generator learns an interesting artist-like strategy. Despite computing the same loss on every generation, the model learns a non-greedy strategy: drawing a rough sketch when t=0, and refining the image only after receiving an initial feedback (t=1). Each of FIGS. 9B-D also allow a comparison of results 902, 904, and 906 respectively of the disclosed embodiments to the pix to pix results in column 910. Thus, these results demonstrate that employing a receptive field discriminator can improve image quality.

TABLE 1

| Base-Model | Discriminator | Per-pixel acc | Per-class acc | Class IOU |
|---|---|---|---|---|
| U-Net[1] | Local | 0.630 | 0.210 | 0.160 |
| 9ResBlock | Local | 0.512 | 0.209 | 0.117 |
| 9ResBlock | Global | 0.600 | 0.193 | 0.133 |
| 9ResBlock | Local + Global | 0.687 | 0.241 | 0.178 |
| 9ResBlock | Receptive | 0.704 | 0.232 | 0.176 |

Table 1 above shows Fully Convolutional Network (FCN) scores for different types of discriminators. The table shows results using local, global, local+global, and receptive discriminators. The results reported for U-Net[1] were originally reported by P. Isola, J.-Y. Zhu, T. Zhou, and A. A. Efros, *Image-to-image translation with conditional adversarial networks*. Arxiv, 2016. This reference also introduces FCN scores.

In additional, Table 2 below shows FCN scores of a recurrent model when training with previous images but without discriminator feedback, and training a model with just discriminator's feedback.

TABLE 2

| Feedback Type | Per-pixel acc | Per-class acc | Class IOU |
|---|---|---|---|
| None | 0.704 | 0.232 | 0.176 |
| Image | 0.727 | 0.234 | 0.180 |
| Discriminator | 0.706 | 0.229 | 0.175 |
| Image and Discriminator | 0.734 | 0.231 | 0.183 |

In Table 2 above, image means that the previous generation was fed back into the generator, and the discriminator means that the discriminator's output was fed back into the generator.

In addition, table 2 above shows FCN scores of a recurrent model when training with previous image but without discriminator feedback. Table 2 also shows training one of the disclosed embodiments with just discriminator's feedback. The model was trained to generate three images (T=2). In both cases, our models performed better when compared to a model trained without any feedback. We observed that the model trained with both the image and discriminator feedback performed the best.

Figure 10:
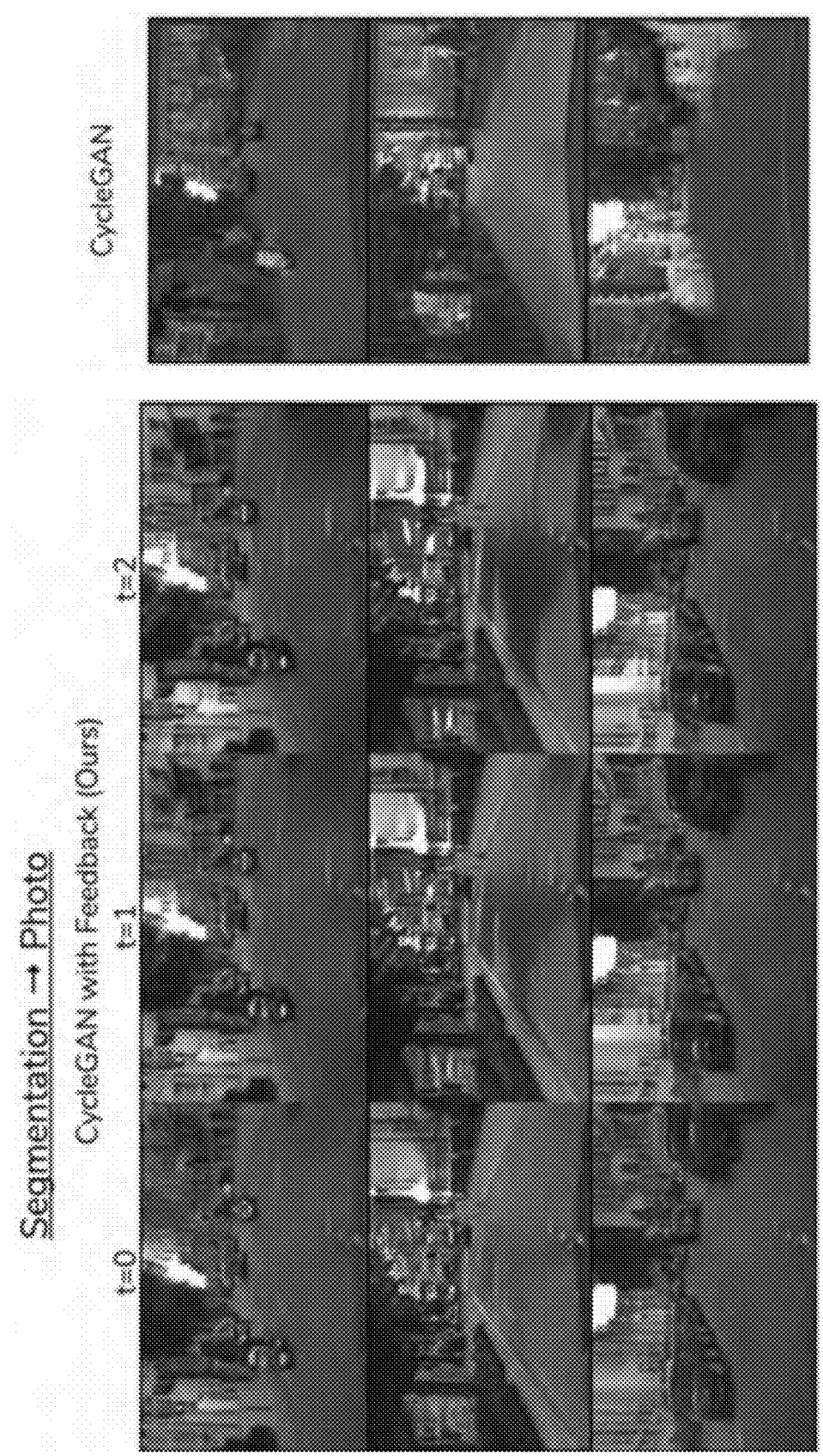
FIG. 10 shows results of using feedback on unpaired image-to-image translation using a cycle-consistent generative adversarial network.

FIG. 10 shows results of using feedback on unpaired image-to-image translation using a cycle-consistent generative adversarial network. FIG. 10 shows results of using segmentation-to-photo using CycleGAN. The model used to generate the results of FIG. 10 was trained using 256×256 images in an unpaired fashion. Similar to paired translation, better results are achieved than with traditional CycleGAN. While the improvement over time is more subtle than achieved with paired translation, the overall generation quality was improved.

Figure 11:
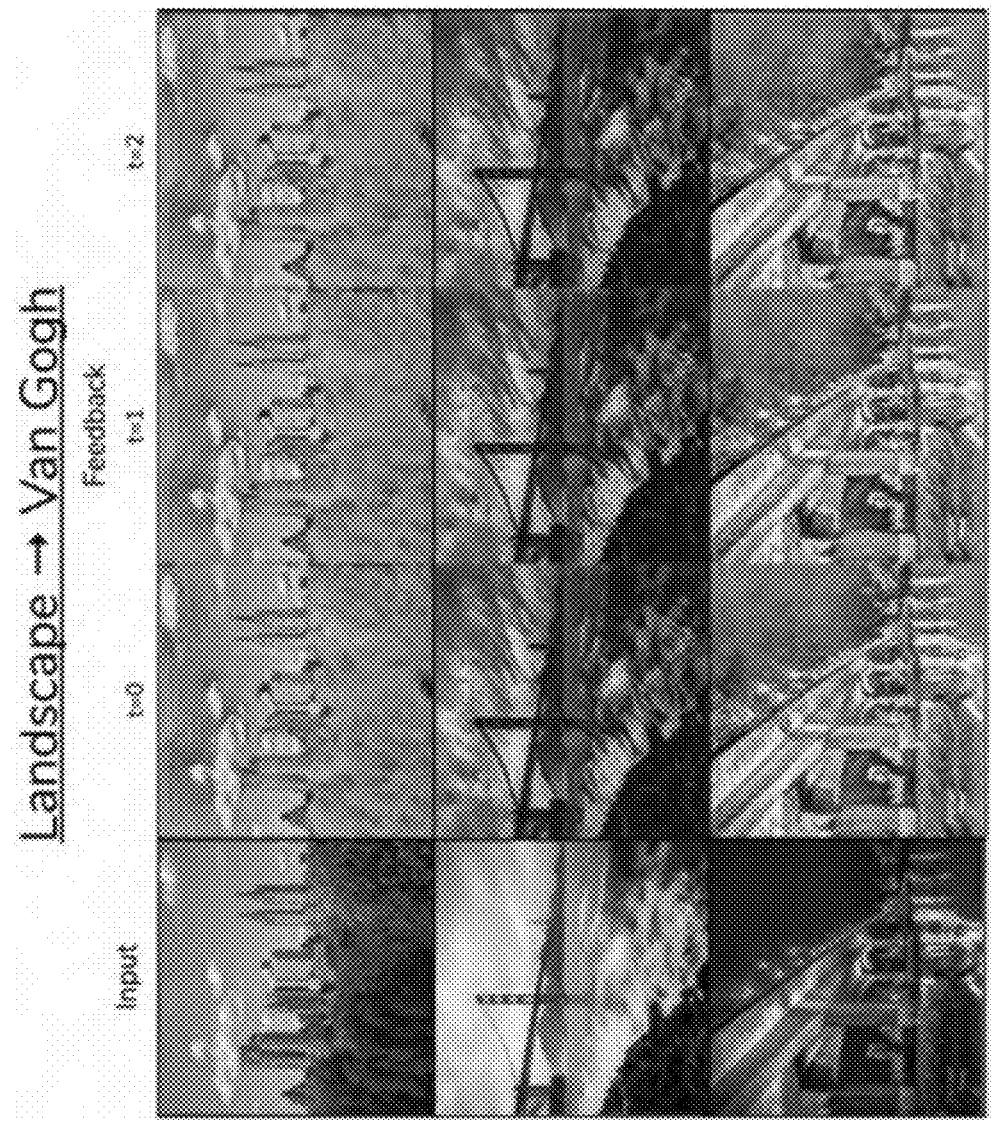
FIG. 11 shows results of a style-transfer.

FIG. 11 shows results using style-transfer. In FIG. 11, a Landscape-to-VanGogh Style transfer trained on CycleGAN used feedback adversarial learning. The model was trained using three generation steps. FIG. 11 shows that unstructured and simple tasks do not benefit as much from using feedback adversarial learning.

The results shown in FIGS. 10 and 11 used a model trained on cityscapes in an unpaired fashion. Cityscapes was used such that the results could be compared between paired and unpaired translation. FIGS. 10 and 11 show the improvements to be more subtle than with paired translation, improvements are still present. Table 3 below shows a substantial increase in FCN segmentation for CycleGAN trained with feedback adversarial learning.

TABLE 3

| Model | Per-pixel ACC | Per-class ACC | Class IOU |
|---|---|---|---|
| CycleGAN[2] | 0.580 | 0.220 | 0.160 |
| CycleGAN with Feedback | 0.690 | 0.236 | 0.169 |

In Table 2, the CycleGan[2] numbers were originally reported in J.-Y. Zhu, T. Park, P. Isola, and A. A. Efros, *Unpaired image-to-image translation using cycle-consistent adversarial networks*, International Conference of Computer Vision (ICCV), 2017.

Table 3 shows a substantial increase in FCN segmentation score for CycleGAN trained with feedback adversarial learning. We set the λS to [0.2, 0.3, 0.3, 0.2] for unpaired image-to-image translation task. We have found that using a larger λ weights on larger receptive field to help on Cycle-GAN. Intuitively, this makes sense because the discriminator has to localize the regions in order to determine the domain, which is often infeasible to compute with small receptive fields.

TABLE 4

| Model | Feedback | Per-pixel acc | Per-class acc | Class IOU |
|---|---|---|---|---|
| 9ResBlock | 0 | 0.704 | 0.232 | 0.176 |
| 9ResBlock | 1 | 0.711 | 0.234 | 0.177 |
| 9ResBlock | 2 | 0.734 | 0.231 | 0.183 |

Table 4 above shows effects in training a model with a varying number of feedbacks. Table 4 shows that using three feedbacks performed the best under the FCN metric. Visualizations in FIGS. 9 and 10 also demonstrate the quality improvement over number of feedback. While it is possible to increase the feedback even further, GPU capacity may limit that ability in some embodiments.

Thus, both paired and unpaired translation are assisted by feedback adversarial learning. The disclosed embodiments can improve generation quality on existing models. Leveraging discriminator information into the generation loop is not constrained to the task of image-to-image translation, and may be used for other adversarial tasks.

Figure 12:
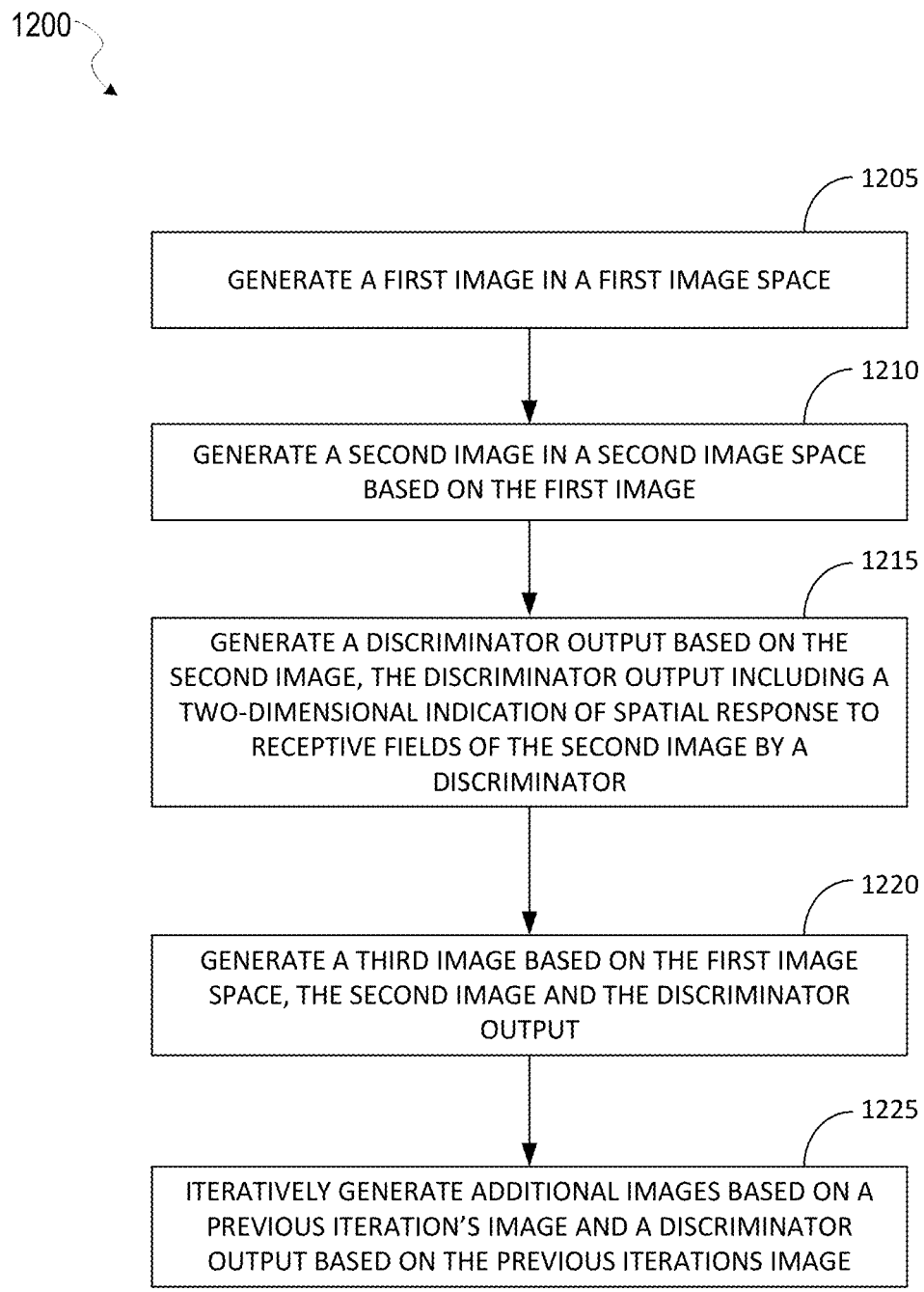
FIG. 12 is a flowchart of a method for feedback adversarial learning.

FIG. 12 is a flowchart of a method for feedback adversarial learning. In various embodiments, one or more of the functions discussed below with respect to process 1200 and FIG. 12 may be performed by hardware processing circuitry. For example, an electronic hardware memory may store instructions that when executed, configure the hardware processing circuitry to perform one or more of the functions discussed below with respect to FIG. 12. The processing unit 1354, and/or processors 1404, discussed below with respect to FIG. 14, may implement the hardware processing circuitry. The electronic memory 1356 may store instructions 1304, discussed below with respect to FIG. 13, to implement the electronic hardware memory discussed above. Similarly, the memory 1406 and instructions 1410, discussed below with respect to FIG. 14, may implement the electronic hardware memory discussed above.

In operation 1205, a first image is generated in a first image space. For example, as discussed above, an encoder $G_e$ may map an image x into a latent vector z, such that Ge: x→z. The image may be obtained from a stable storage device or captured via an imaging sensor in various embodiments.

In operation 1210, a second image is generated within a second image space. The generation is based on the first image. Also as discussed above, a decoder $G_d$ may map the latent vector z back to the image space y, $G_d$: z→y. A goal of a generator G is to generate realistic images that can fool the discriminator D. We can write the generated image ŷ as:

$$\hat{y}=G(x)=G_d(G_e(x)) \quad (2)$$

In operation 1215, a discriminator output (e.g., D(ŷ0)) is generated based on the second image, the discriminator output including a two-dimensional indication of spatial response to receptive fields of the second image by a discriminator.

In operation 1220, a third image is generated (e.g., ŷ1) based on the first image space, the second image (e.g., ŷ0) and the discriminator output (e.g., D(ŷ0)).

In operation 1225, process 1200 iteratively generates additional images (e.g., yt) based on a previous iterations' image and a discriminator output based on the previous iterations image. In some aspects, the additional images are generated according to:

$$y_t = G_d(G_e(x), y_{t-1}, r_{t-1})$$

where:
x is the first image,
$y_t$ is an additional image at iteration t,
$y_{t-1}$ is an additional at iteration t−1,
$r_{t-1}$ is a discriminator output at iteration t−1,
$G_e(\ )$ is a generator configured to map image x to the first image space
$G_d(\ )$ is a decoder configured to generate the additional image ($y_t$) based on a discriminator output of a previous iteration ($r_{t-1}$).

In some aspects, the generator and discriminator are separate convolutional neural networks. The generator $G_d(G_e(\ ))$ may be trained to minimize a loss function:

$$\mathcal{L}_{LSCAN}(x; G) = \mathbb{E}[(1-(D(G(x))))^2]$$

where:
G(x) is $G_d(G_e(x))$
x is the first image (Is X a training image in this case?)
D( ) is the discriminator
$\mathbb{E}$ is an expected loss value over a set of training images?

In some aspects, the discriminator is trained to minimize a loss function:

$$\mathcal{L}_{LSCAN}(x;D) = \mathbb{E}[(1-D(y))^2] + \mathbb{E}[(D(G(x)))^2]$$

where:
x is the first image.
y is a ground truth image in a second domain.
E is an expected loss.

In some aspects, the generator and discriminator are separate convolutional neural networks. In some aspects, the generator $G_d(G_e(\ ))$ is trained to minimize a loss function determined by:

$$\mathcal{L}_{FBGAN}(x;G) = \sum_{t \in T} \sum_{l \in R} \lambda_l (\mathbb{E}[\||D(G(x, t), l) - 1\||_1])$$

where:
$\lambda_l$ is a constant that scales the importance of each receptive field,
x is one training image in a set of training images (X)
t identifies an iteration,
T is a total number of iterations,
R is a set of receptive field sizes for the loss calculation,
l is a particular receptive field size within R,
E is an expected loss value over a set of training images. In some aspects, this may be an average loss over a set of training images.

In some aspects, the discriminator is configured to generate an output comprising a collection of responses $\{r_t^l\} l \in R$ at differing receptive field sizes based on the second image, where R is a set of receptive field sizes, and l is one of the respective field sizes. The set of receptive field sizes may be 34×34, 70×70, 142×142, and 286×286 in some embodiments. In some embodiments, the discriminator is trained to minimize a loss determined by $$\mathcal{L}_{FBGAN} \sum_{t \in T} \sum_{l \in R} \lambda_l (\mathbb{E}[\||D(G(x, t), l) - 1\||_1] + \mathbb{E}[\||D(y, l)\||_1])$$

where:
$\lambda_l$ is a constant that scales the importance of each receptive field,
t identifies an iteration,
T is a total number of iterations,
R is a set of receptive field sizes for the loss calculation,
l is a particular receptive field size within R The discriminator may be configured to generate the spatial response to the receptive fields of the second image based on the training of the discriminator. The training associated each training image in a set of training images with a value of one (1) and images generated by $G_d(G_e$(the training image)) with a value of zero.

Software Architecture

Figure 13:
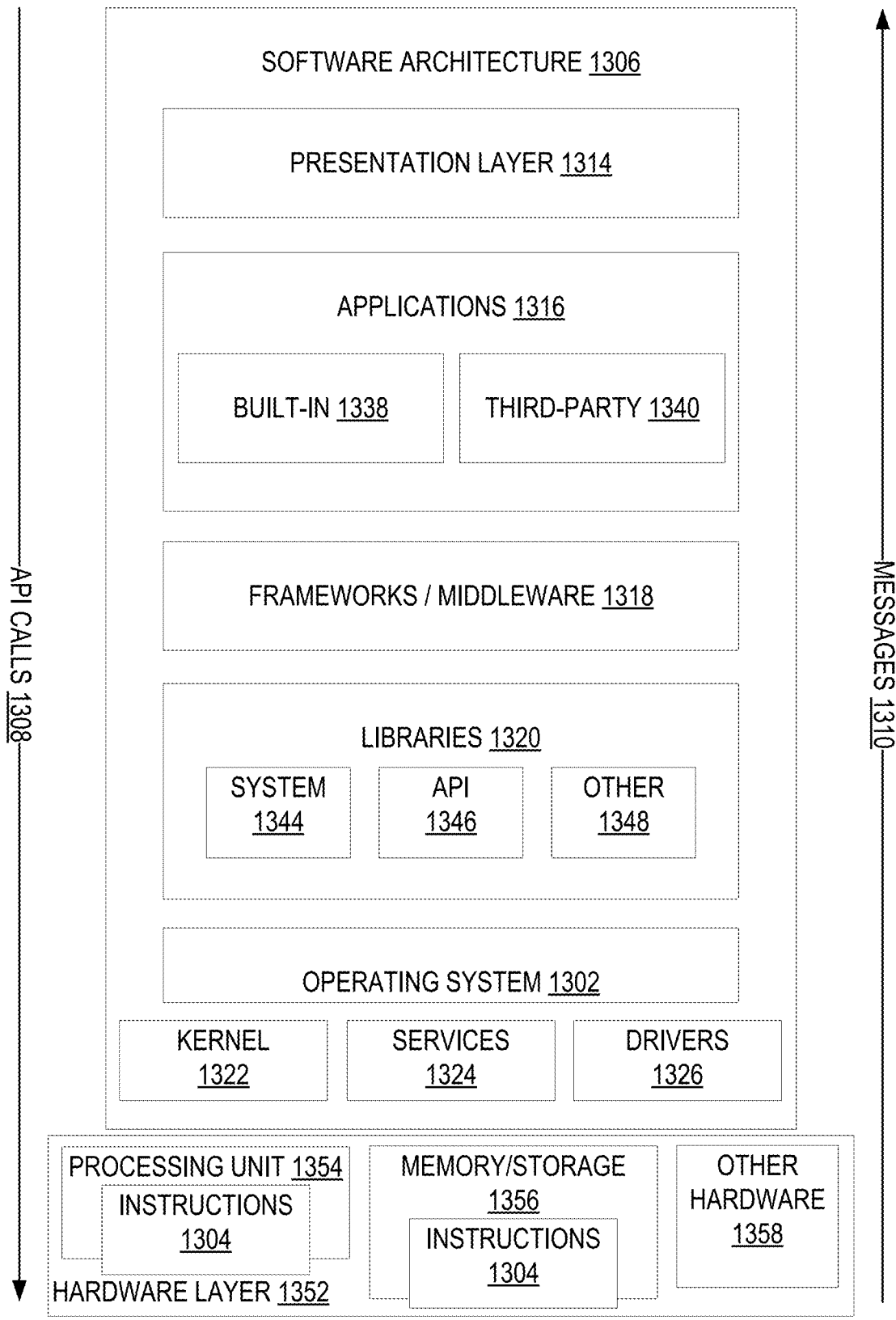
FIG. 13 is a block diagram illustrating an example software architecture.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as a machine 1400 of FIG. 14 that includes, among other things, processors 1404, memory/storage 1406, and I/O components 1418. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes memory and/or storage 1356, which also have the executable instructions 1304. The hardware layer 1352 may also comprise other hardware 1358.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response as messages 1310. The layers illustrated are representative in nature and not all software architectures have all layers. For example, some mobile or special-purpose operating systems may not provide a frameworks/middleware 1318 layer, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems interactions with a user may occur through a presentation layer, such as the presentation layer 1314. In these systems, the application/component "logic" can be separated from the aspects of the application/component that interact with a user.

Exemplary Machine

Figure 14:
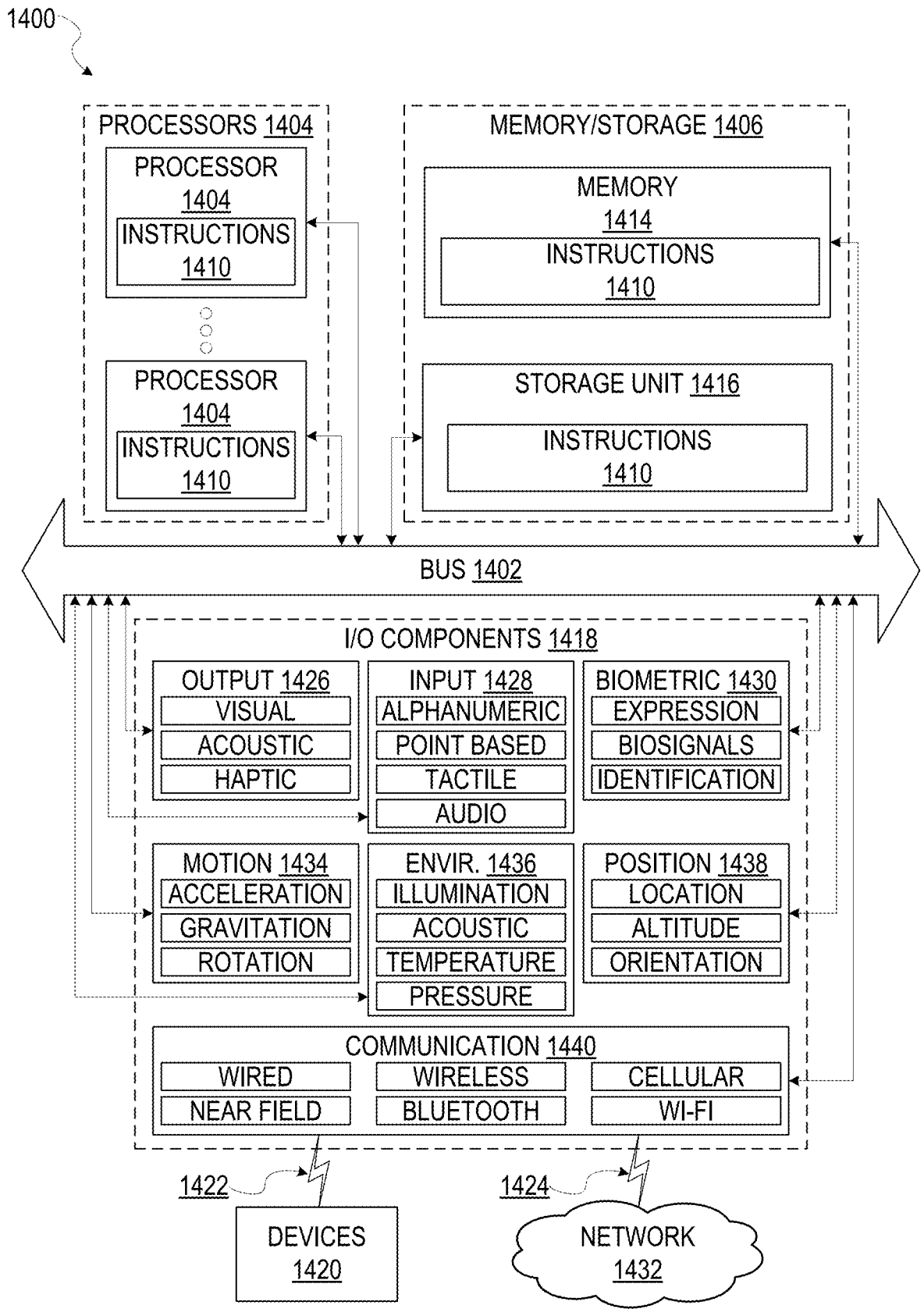
FIG. 14 is a block diagram illustrating components (also referred to herein as "modules") of a machine 1400, according to some exemplary embodiments.

FIG. 14 is a block diagram illustrating components (also referred to herein as "modules") of a machine 1400, according to some exemplary embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of the processors 1404 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1418 may include a wide variety of components to provide a user interface for receiving input, providing output, producing output, transmitting information, exchanging information, capturing measurements, and so on. The specific I/O components 1418 that are included in the user interface of a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various exemplary embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1428 may also include one or more image-capturing devices, such as a digital camera for generating digital images and/or video.

In further exemplary embodiments, the I/O components 1418 may include biometric components 1430, motion components 1434, environment components 1436, or position components 1438, as well as a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via a coupling 1424 and a coupling 1422 respectively. For example, the communication components 1440 may include a network interface component or other suitable device to interface with the network 1432. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method, comprising:
generating a first image in a first image space ($G_e(x)$);
generating a second image ($\hat{y}_0$) in a second image space based on the first image space;
generating a discriminator output $D(\hat{y}_0)$ based on the second image, the discriminator output including a two-dimensional indication of spatial response to receptive fields of the second image by a discriminator;
generating a third image ($\hat{y}_1$) based on the first image space, the second image ($\hat{y}_0$) and the discriminator output $D(\hat{y}_0)$;

iteratively generating additional images ($\hat{y}_t$) based on a previous iterations' image and a discriminator output based on the previous iterations image, according to:

$$y_t = G_d(G_e(x), y_{t-1}, r_{t-1})$$

where:
  x is the first image,
  $y_t$ is an additional image at iteration t,
  $y_{t-1}$ is an additional at iteration t−1,
  $r_{t-1}$ is a discriminator output at iteration t−1,
  $G_e(\ )$ is a generator configured to map image x to the first image space
  $G_d(\ )$ is a decoder configured to generate the additional image ($y_t$) based on a discriminator output of a previous iteration ($r_{t-1}$).

2. The method of claim 1, wherein the generator and discriminator are separate convolutional neural networks, and wherein the generator $G_d(G_e(\ ))$ is trained to minimize a loss function:

$$\mathcal{L}_{LSGAN}(x;G) = \mathbb{E}\left[(1-(D(G(x))))^2\right]$$

where:
  G(x) is $G_d(G_e(x))$,
  x is the first image,
  D( ) is the discriminator,
    is an expected loss value over a set of training images.

3. The method of claim 2, wherein the discriminator is trained to minimize a loss function:

$$\mathcal{L}_{LSGAN}(x;D) = \mathbb{E}\left[(1-D(y))^2\right] + \mathbb{E}\left[(D(G(x)))^2\right]$$

where:
  x is the first image,
  X is a set of training images,
  y is a ground truth image,
  E is an expectation, in some aspects, the expectation may be an expected loss over a set of training images, in some aspects, the expectation may be an average loss.

4. The method of claim 1, wherein the generator and discriminator are separate convolutional neural networks, and wherein the generator $G_d(G_e(\ ))$ is trained to minimize a loss function determined by:

$$\mathcal{L}_{FBGAN}(x;G) = \sum_{t \in T}\sum_{l \in R} \lambda_l (\mathbb{E}[\|D(G(x,t),l)-1\|_1])$$

where:
  $\lambda_l$ is a constant that scales the importance of each receptive field,
  x is one training image in a set of training images (X),
  t identifies an iteration,
  T is a total number of iterations,
  R is a set of receptive field sizes for the loss calculation,
  l is a particular receptive field size within R,
  E is an expected loss over a set of training images (X), the expected loss may in some aspects, be an average loss over the set of training images.

5. The method of claim 1, wherein the discriminator is configured to generate an output comprising a collection of responses $\{r_t^l\}l \in R$ at differing receptive field sizes based on the second image, where
  R is a set of receptive field sizes,
  l is one of the respective field sizes.

6. The method of claim 5, wherein the set of receptive field sizes are 34×34 pixels, 70×70 pixels, 142×142 pixels, and 286×286 pixels.

7. The method of claim 5, wherein the discriminator is trained to minimize a loss determined by $$\mathcal{L}_{FBGAN} \sum_{t \in T}\sum_{l \in R} \lambda_l (\mathbb{E}[\|D(G(x,t),l)-1\|_1] + \mathbb{E}[\|D(y,l)\|_1])$$

where:
  $\lambda_l$ is a constant that scales the importance of each receptive field,
  t identifies an iteration
  T is a total number of iterations
  R is a set of receptive field sizes for the loss calculation
  l is a particular receptive field size within R.

8. The method of claim 1, wherein the discriminator is configured to generate the spatial response to the receptive fields of the second image based on the training of the discriminator which associated each training image in a set of training images with a value of one (1) and images generated by $G_d(G_e(\text{the training image}))$ with a value of zero.

9. An apparatus, comprising:
  hardware processing circuitry;
  a hardware memory storing instructions that when executed, configure the hardware processing circuitry to perform operations comprising:
    generating a first image in a first image space ($G_e(x)$);
    generating a second image ($\hat{y}_0$) in a second image space based on the first image space;
    generating a discriminator output $D(\hat{y}_0)$ based on the second image, the discriminator output including a two-dimensional indication of spatial response to receptive fields of the second image by a discriminator;
    generating a third image ($\hat{y}_1$) based on the first image space, the second image ($\hat{y}_0$) and the discriminator output $D(\hat{y}_0)$;
    iteratively generating additional images ($y_t$) based on a previous iterations' image and a discriminator output based on the previous iterations image, according to:

$$y_t = G_d(G_e(x), y_{t-1}, r_{t-1})$$

where:
  x is the first image,
  $y_t$ is an additional image at iteration t,
  $y_{t-1}$ is an additional at iteration t−1,
  $r_{t-1}$ is a discriminator output at iteration t−1,
  $G_e(\ )$ is a generator configured to map image x to the first image space
  $G_d(\ )$ is a decoder configured to generate the additional image ($y_t$) based on a discriminator output of a previous iteration ($r_{t-1}$).

10. The apparatus of claim 9, wherein the generator and discriminator are separate convolutional neural networks, and wherein the generator $G_d(G_e(\ ))$ is trained to minimize a loss function:

$$\mathcal{L}_{LSGAN}(x;G) = \mathbb{E}\left[(1-(D(G(x))))^2\right]$$

where:
  G(x) is $G_d(G_e(x))$,
  x is the first image,
  D( ) is the discriminator,
  $\mathbb{E}$ is an expected loss value over a set of training images.

11. The apparatus of claim 10, wherein the discriminator is trained to minimize a loss function:

$$\mathcal{L}_{LSGAN}(x;D) = \mathbb{E}\left[(1-D(y))^2\right] + \mathbb{E}\left[(D(G(x)))^2\right]$$

where:
x is the first image,
X is a set of training images,
y is a ground truth image,
E is an expectation, in some aspects, the expectation may be an expected loss over a set of training images, in some aspects, the expectation may be an average loss.

12. The apparatus of claim 9, wherein the generator and discriminator are separate convolutional neural networks, and wherein the generator $G_d(G_e(\ ))$ is trained to minimize a loss function determined by:

$$\mathcal{L}_{FBGAN(x;G)} = \sum_{t \in T}\sum_{l \in R} \lambda_l (\mathbb{E}[\|D(G(x, t), l) - 1\|_1])$$

where:
$\lambda_l$ is a constant that scales the importance of each receptive field,
x is one training image in a set of training images (X),
t identifies an iteration,
T is a total number of iterations,
R is a set of receptive field sizes for the loss calculation,
l is a particular receptive field size within R,
E is an expected loss over a set of training images (X), the expected loss may in some aspects, be an average loss over the set of training images.

13. The apparatus of claim 9, wherein the discriminator is configured to generate an output comprising a collection of responses $\{r_l^j\}l \in R$ at differing receptive field sizes based on the second image, where
R is a set of receptive field sizes,
l is one of the respective field sizes.

14. The apparatus of claim 13, wherein the set of receptive field sizes are 34×34 pixels, 70×70 pixels, 142×142 pixels, and 286×286 pixels.

15. The apparatus of claim 13, wherein the discriminator is trained to minimize a loss determined by $$\mathcal{L}_{FBGAN} \sum_{t \in T}\sum_{l \in R} \lambda_l (\mathbb{E}[\|D(G(x, t), l) - 1\|_1] + \mathbb{E}[\|D(y, l)\|_1])$$

where:
$\lambda_l$ is a constant that scales the importance of each receptive field,
t identifies an iteration
T is a total number of iterations
R is a set of receptive field sizes for the loss calculation
l is a particular receptive field size within R.

16. The apparatus of claim 9, wherein the discriminator is configured to generate the spatial response to the receptive fields of the second image based on the training of the discriminator which associated each training image in a set of training images with a value of one (1) and images generated by $G_d(G_e(\text{the training image}))$ with a value of zero.

17. A non-transitory computer readable medium comprising instructions that when executed configured hardware processing circuitry to perform operations comprising:
generating a first image in a first image space ($G_e(x)$);
generating a second image ($\hat{y}_0$) in a second image space based on the first image space;
generating a discriminator output $D(\hat{y}_0)$ based on the second image, the discriminator output including a two-dimensional indication of spatial response to receptive fields of the second image by a discriminator;
generating a third image ($\hat{y}_1$) based on the first image space, the second image ($\hat{y}_0$) and the discriminator output $D(\hat{y}_0)$;
iteratively generating additional images ($y_t$) based on a previous iterations' image and a discriminator output based on the previous iterations image, according to:

$$y_t = G_d(G_e(x), y_{t-1}, r_{t-1})$$

where:
x is the first image,
$y_t$ is an additional image at iteration t,
$y_{t-1}$ is an additional at iteration t−1,
$r_{t-1}$ is a discriminator output at iteration t−1,
$G_e(\ )$ is a generator configured to map image x to the first image space
$G_d(\ )$ is a decoder configured to generate the additional image ($y_t$) based on a discriminator output of a previous iteration ($r_{t-1}$).

18. The non-transitory computer readable medium of claim 17, wherein the generator and discriminator are separate convolutional neural networks, and wherein the generator $G_d(G_e(\ ))$ is trained to minimize a loss function:

$$\mathcal{L}_{LSGAN}(x;G) = \mathbb{E}[(1-(D(G(x))))^2]$$

where:
G(x) is $G_d(G_e(x))$,
x is the first image,
D( ) is the discriminator,
is an expected loss value over a set of training images.

19. The non-transitory computer readable medium of claim 18, wherein the discriminator is trained to minimize a loss function:

$$\mathcal{L}_{LSGAN}(x;D) = \mathbb{E}[(1-D(y))^2] + \mathbb{E}[(D(G(x)))^2]$$

where:
x is the first image,
X is a set of training images,
y is a ground truth image,
E is an expectation, in some aspects, the expectation may be an expected loss over a set of training images, in some aspects, the expectation may be an average loss.

20. The non-transitory computer readable medium of claim 17, wherein the generator and discriminator are separate convolutional neural networks, and wherein the generator $G_d(G_e(\ ))$ is trained to minimize a loss function determined by:

$$\mathcal{L}_{FBGAN(x;G)} = \sum_{t \in T}\sum_{l \in R} \lambda_l (\mathbb{E}[\|D(G(x, t), l) - 1\|_1])$$

where:
$\lambda_l$ is a constant that scales the importance of each receptive field,
x is one training image in a set of training images (X),
t identifies an iteration,
T is a total number of iterations,
R is a set of receptive field sizes for the loss calculation,
l is a particular receptive field size within R,
E is an expected loss over a set of training images (X), the expected loss may in some aspects, be an average loss over the set of training images.

* * * * *

UNITED STATES PATENT AND TRADEMARK OFFICE
CERTIFICATE OF CORRECTION

PATENT NO. : 11,429,841 B1
APPLICATION NO. : 16/192437
DATED : August 30, 2022
INVENTOR(S) : Huh et al.

It is certified that error appears in the above-identified patent and that said Letters Patent is hereby corrected as shown below:

On the Title Page

On page 2, in Column 1, item (56) under "Other Publications", Line 8, delete ""Image-to-lmage" and insert --"Image-to-Image-- therefor On page 2, in Column 1, item (56) under "Other Publications", Line 20, delete "Image-to-lmage" and insert --Image-to-Image-- therefor On page 2, in Column 2, item (56) under "Other Publications", Lines 26-27, delete "Image-to-lmage" and insert --Image-to-Image-- therefor On page 2, in Column 2, item (56) under "Other Publications", Line 40, delete "Image-to-lmage" and insert --Image-to-Image-- therefor In the Claims In Column 17, Line 12, in Claim 1, after "space", insert --,--

Signed and Sealed this
Twentieth Day of June, 2023

Katherine Kelly Vidal
*Director of the United States Patent and Trademark Office*